United States Patent [19]

Liu

[11] Patent Number: 5,811,776
[45] Date of Patent: Sep. 22, 1998

[54] METHOD AND APPARATUS FOR ACCURATELY LOCATING DATA REGIONS IN STORED IMAGES OF SYMBOLS

[75] Inventor: Lingnan Liu, Lynnwood, Wash.

[73] Assignee: Intermec Corporation, Everett, Wash.

[21] Appl. No.: 607,100

[22] Filed: Feb. 26, 1996

[51] Int. Cl.$^6$ .................................................. G06K 7/10
[52] U.S. Cl. ........................................ 235/462; 235/463
[58] Field of Search ...................................... 235/462, 463

[56] References Cited

U.S. PATENT DOCUMENTS

| | | | |
|---|---|---|---|
| 4,988,852 | 1/1991 | Krishnan | 235/462 |
| 5,155,343 | 10/1992 | Chandler et al. | 235/462 |
| 5,304,787 | 4/1994 | Wang | 235/462 |
| 5,319,181 | 6/1994 | Shellhammer et al. | 235/462 |
| 5,324,923 | 6/1994 | Cymbalski et al. | 235/454 |
| 5,365,048 | 11/1994 | Komiya et al. | 235/462 |
| 5,378,881 | 1/1995 | Adachi | 235/462 |
| 5,378,883 | 1/1995 | Batterman et al. | 235/472 |
| 5,486,946 | 1/1996 | Jachimowicz et al. | 359/263 |
| 5,565,669 | 10/1996 | Lin | 235/462 |
| 5,591,956 | 1/1997 | Longacre, Jr. et al. | 235/494 |

FOREIGN PATENT DOCUMENTS

| | | | |
|---|---|---|---|
| 0 449 634 A2 | 10/1991 | European Pat. Off. | G06K 7/10 |
| 0 450 878 A1 | 10/1991 | European Pat. Off. | G06K 7/10 |

OTHER PUBLICATIONS

Pavlidis, Theo et al., "Information Encoding with Two-Dimensional Bar Codes," Symbol Technologies, Bohemia, NY, Jun. 1992, pp. 18–28.

Palmer, Roger C., "The Bar Code Book, Reading, Printing, and Specification of Bar Code Symbols," Helmers Publishing, Inc., Peterborough, New Hampshire, 1989, pp. 19–20, 61–62, 90–95, 137–148.

"Uniform Symbology Specification Code One," AIM USA, Pittsburgh, Pennsylvania, Jul. 1994, pp. 1–32.

Primary Examiner—Donald T. Hajec
Assistant Examiner—Mark Tremblay
Attorney, Agent, or Firm—Seed and Berry LLP

[57] ABSTRACT

A method and apparatus locates multiple "bounding boxes" within an image of a symbol located within an image stored by a reader. The symbol preferably has a recognition pattern with an longitudinally extending bar and at least one vertically extending reference bar, such as in the Code One symbology. The method locates the positions of landmark points within the stored image. Landmark points include points at the end of the longitudinally extending bar, points at the corner or root formed between the longitudinally extending bar and the vertically extending bar, points at the ends of the vertically extending bars, and points at the intersection between the bars and blocks that extend transversely therefrom. Based on the locations of the landmark points, horizontal and vertical line functions are defined between collinear landmark points. Based on the intersection of the line functions, multiple bounding boxes are constructed to determine the periphery and all data areas of the symbol within the stored image.

21 Claims, 20 Drawing Sheets

METHOD AND APPARATUS FOR ACCURATELY LOCATING DATA REGIONS IN STORED IMAGES OF SYMBOLS

TECHNICAL FIELD

The present invention relates to determining the location of data regions of a symbol in a stored image, and more particularly, to methods and apparatus for identifying the areas of a two-dimensional matrix symbol where data are encoded in a stored image for processing and decoding by a symbology reader.

BACKGROUND OF THE INVENTION

Machine readable symbologies are widely used for data collection. The first bar code symbologies developed, such as UPC, EAN, Code 39 and Code 93 can be referred to as "linear" symbologies because the data in a given symbol was decoded along one direction or axis. The next generation of bar code symbologies, called stacked reader symbologies, such as Code 49 and PDF 417, increase the information density of the symbol by employing several adjacent rows, each row having several symbol characters defined by groups of multiple width bars and spaces.

A recently developed symbology, Code One, is a two-dimensional matrix symbology. As shown by a symbol 800 of FIG. 1, Code One symbols include a recognition pattern 802, a matrix of square data cells 804 (rather than one or more rows of bars and spaces), and vertical reference patterns 806 that extend away from the recognition pattern 802. The areas of square data cells 804 above the recognition pattern 802, and below the recognition pattern 802, respectively, are defined by an upper bounding box 808 and a lower bounding box 809. The recognition pattern 802 runs horizontally through the Code One symbol 800, while the vertical reference patterns 806 extend perpendicularly from the recognition pattern 802. These vertical recognition patterns 806 are used to help find the symbol, and determine the symbol's tilt and orientation to take into account any surface curvature.

Each of the data cells 804 in the matrix encodes one bit of data: a white data cell represents a 0 and a black data cell represents a 1. Each symbol character in the Code One symbology is generally constructed from eight data cells in a rectangular array 807 of two rows that each have four data cells. Each set of eight data cells in a Code One symbol character encodes an 8-bit byte of binary data. The ASCII values in the Code One symbology are equal to the standard ASCII values in the computer industry plus one.

In a given Code One symbol, the symbol characters are ordered in a row-wise fashion from left to right, and the "rows" of symbol characters are arranged from top to bottom in the symbol. Each row of symbol characters in a Code One symbol consists of a pair of adjacent rows of data cells. The first symbol character in the Code One symbol is in the top left corner of the symbol and the last symbol character is in the bottom right corner. A reader analyzes the symbol characters in a Code One symbol from the first symbol character in the symbol's top left corner rightward to the right edge of the top row, and then from the left edge rightward along the second row, and so forth (assuming the symbol is oriented as shown in FIG. 1). If the reader encounters no difficulties, then each symbol character analyzed in a Code One or other symbology is converted into corresponding data to be used by the reader, the user, or other peripheral equipment.

The recognition pattern 802 is comprised of a plurality of elements including bars 810 and spaces 812. The recognition pattern 802 is used to identify the version (i.e., the type) of Code One symbol being used. Further, the recognition pattern 802 is used to determine the X-dimension of the Code One symbol 800. For example, the X-dimension represents the smallest height (or width) of the data cells 804 in the Code One symbology. The X-dimension is used to determine the intended dimension that an area symbology is based on, regardless of printing errors, and is necessary for decoding the symbology.

The reader typically used to scan the Code One symbol 800 is a two-dimensional imaging device which detects all the spaces 810 and the bars 812 of the recognition pattern 802, as well as the vertical reference patterns 806 using a fast linear image search routine used in high-speed scanning applications. A memory stores the scanned image and includes an array of memory locations that correspond to and represent a pixel field of view of the reader (e.g., a rectangular array of 582 by 752 pixels). The stored image is referenced by a Cartesian coordinate system relative to the imaging device or memory so that the location of each pixel is represented by a pair of numbers indicating the horizontal and vertical position of the pixel in the stored image. For example, the first pixel in the top left corner of the stored image is assigned the Cartesian coordinates (0,0) while the bottom right-most pixel is assigned the coordinates (752, 582). Therefore, data cells 804 associated with groups of pixels can be arithmetically located using known geometric and trigonometric properties based on the coordinate system.

In the prior art, as shown in FIG. 2, to determine the location of all the data cells 804 within the stored image, the image search routine was used to locate a long bar 814 of the recognition pattern 802, then the X-dimension was determined from the recognition pattern 802. Next, an angle 816 that the long bar 814 makes with the X axis of the Cartesian coordinate system of the overall image was determined. Finally, using the X-dimension and angle 816, a bounding box 807 of the symbol 800 defined by the boundary lines of the symbol 800 was determined.

The prior method computes one bounding box 807 for the Code One symbol 800 enclosing the entire symbol 800. The boundary box 807 is the sum of upper bounding box 808, lower bounding box 809 and the center pattern recognition 802. To determine the size and location of the bounding box 807, an end point 818 of the long bar 814, i.e., $ep_1$, was located and a path 820, substantially along the Y-axis of the Cartesian coordinate system, i.e., directed away from the recognition pattern 802, was traversed for a predetermined number of the X-dimensions. The direction of the path 820 was determined by the angle that is vertical to the long bar 814 (i.e., the angle 816) to establish an end corner point $cp_1$ 824 of the bounding box 807. The other corner point 828, i.e., $cp_2$, of the bounding box 807, and the other corner points 842 and 844, i.e., $cp_3$ and $cp_4$, of the bounding box 807 were determined in a similar manner. With these corner points, the complete bounding box 807 was defined, and all square data cells 804 were assumed to lie within this region for purposes of information retrieval from the image when the size of the X-dimension and the version of the symbol were known.

Although the prior art method of determining the bounding box 807 of the Code One symbol is effective when the symbol 800 is in its proper position, and has no significant surface curvature, it becomes highly prone to errors when the symbology 800 is optically distorted, e.g., when an image of the symbol is stored when a reader is significantly tilted with respect to the symbol. In other words, when the upper and lower bounding boxes 808 and 809 do not have the same size and shape, and the X-dimension varies within the symbol, data can be lost during the decoding process.

For example, as shown by an optically distorted symbol 801 in FIG. 3, even a slight deviation between the angle the long bar 814 makes with an X axis of the Cartesian coordinate system causes the computed bounding box 807 defined by the dashed boundaries with four corners cp1, cp2, cp3, and cp4 to differ from the true bounding box for the symbol (shown as the solid line quadrilateral 830). Additionally, optical distortions causing the stored image of the symbol to appear trapezoidal or otherwise optically distorted, as shown in FIG. 3, causes the perimeter of the stored image of the symbol 830 to differ significantly from the bounding box 807 computed by the prior art method. As a result, information retrieval errors will result by sampling within the computed bounding box 807. Important data within the true bounding box 830 can be ignored, such as the information located in shaded areas 837 of FIG. 3. This is because when following an angle that has a slight error, the resulting positional error can be huge if the distance along the path is large enough. In other words, the error will accumulate to a significant degree using the prior art method, even if only a small amount of error is present in the direction of the path. Similarly, when there is a slight error in X-dimension, the total error will be larger if the distance is large enough. Thus, what is needed is a method of determining the bounding box that localized the data region and is free from error, and which will ensure that all the square data cells 804 fall within the true bounding box.

SUMMARY OF THE INVENTION

A method and apparatus locates four or more "bounding boxes" within one or more data areas in an image of a symbol located within an image stored by a reader. The symbol preferably has a recognition pattern with a longitudinally extending bar and at least two vertically reference bars extending therefrom, such as in the Code One symbology. Each vertically extending reference bar includes at least one horizontally extending block (often with one block at the free end of the bar and one or more between the free end and the longitudinally extending bar).

The method locates the positions of landmark points within the stored image. Landmark points include points at the free ends of the longitudinally extending bars, points at the corner or root formed between the longitudinally extending bar and the vertically extending bars, and points at the corners of the blocks and the vertically extending bars. Based on the locations of the landmark points, lines are projected between collinear landmark points to construct at least four bounding boxes, two above the center recognition pattern and two below it, and thereby determine the boundaries of the data areas of the symbol within the stored image. As noted above, errors can result while attempting to define a bounding box surrounding the entire symbol (especially if the symbol suffers from optical distortion). By constructing smaller bounding boxes, many of such distortions are significantly reduced.

In a broad sense, the present invention embodies a method for computing a location of data regions enclosed by the corresponding bounding boxes in a stored image of a symbol. The symbol includes a recognition pattern having an outermost bar and at least one vertical reference pattern extending perpendicularly from the recognition pattern. The method includes the steps of: (i) locating a position of first and second end portions of the outermost bar of the recognition pattern; (ii) locating a position of a root portion of an intersection between each vertical reference pattern and the outermost bar; (iii) locating a position of an outermost portion of each vertical reference pattern; (iv) determining a position of first and second corner portions for the symbol by extending at least one line from the outermost portion a predetermined distance in a predetermined direction; and (v) defining at least first and second areas enclosing the data regions of the symbol, the first area being defined by the positions of the first end portion, the first corner portion, the root portion, and the outermost portion, and the second area being defined by the second end portion, the second corner portion, the root portion, and the outermost portion.

The present invention also embodies an apparatus for decoding a machine-readable symbol that represents encoded information. The symbol has a recognition pattern with an outermost bar and at least one vertical reference pattern extending approximately perpendicular from the recognition pattern. The apparatus includes a sensor that receives light reflected from the symbol. The sensor produces an output signal therefrom.

A receiver receives the output signal and produces a data signal indicative of the encoded information, the recognition pattern and at least one vertical reference pattern. A processor for decoding the encoded information encoded in the symbol is programmed to (a) locate a position of a first end point and a second end point of the outermost bar of the recognition pattern, (b) locate a root position of each of the vertical reference patterns and an outermost point of each of the at least one vertical reference patterns, (c) determine a position of a first corner point and a second corner point for this symbol by extending at least one line from the outermost point a predetermined distance in a predetermined direction, (d) define a plurality of bounding boxes using the positions of the first and second end points, the first and second corner points, the outermost points, and the positions of the at least one vertical reference patterns, and (e) decode the encoded information within the plurality of bounding boxes. The processor is also programmed to similarly determine the periphery of a lower data region of the symbol.

DETAILED DESCRIPTION OF THE INVENTION

Figure 4:
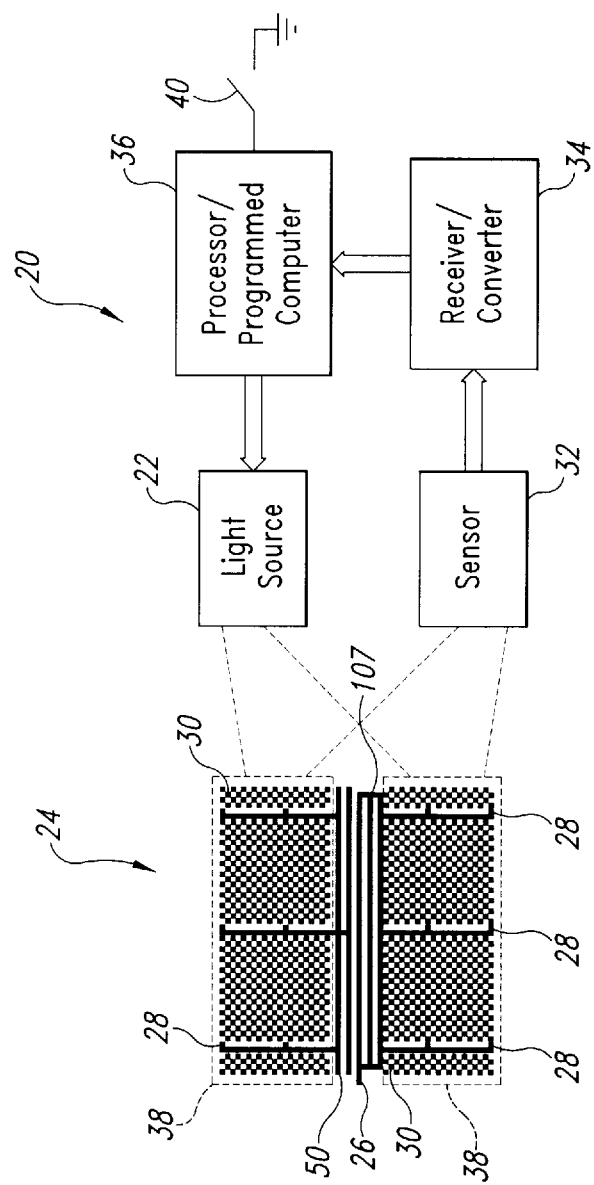
FIG. 4 shows a block diagram of a symbology reader of the present invention.

As shown in FIG. 4, a data collection symbology reader 20 of the present invention includes a light source 22 that illuminates a data collection symbol, such as Code One symbol 24 having a recognition pattern 26 and vertical reference patterns 28, as well as square data cells 30. As used herein, a data collection symbol refers to a symbol from any linear, stacked, area or other machine-readable symbology. A sensor 32 in the reader 20 receives the light reflected from the symbol 24 and converts the received light into an electrical signal. The light source 22 is preferably a flashbulb, infrared light source, one or more LEDs or other light-emitting elements, while the sensor 32 is preferably a charge-coupled device ("CCD"), two-dimensional semiconductor array, vidicon, or other area imager capable of converting received light into electrical signals.

A receiver or converter 34 receives the electrical signals from the sensor 32 and converts it into a signal to be processed by a programmed computer or processor 36. Typically, the sensor 32 produces an analog signal that represents the modulated light reflected from the elements in the symbol 24. If the processor 20 is a digital computer, then the converter 34 converts the analog signal into a digital signal to be processed by the processor 36. The converter 34 and/or processor 36 preferably include a memory for storing the digital signal. As described more fully below, the processor 36 of the reader 20 performs a routine stored in memory that provides an accurate estimate of bounding boxes 38 of the symbol 24 regardless of whether the symbol 24 is tilted with respect to the reader 20. The routine accomplishes this by finding positions on the vertical reference bars 28 as well as top and bottom bars 50 and 107 in the recognition pattern 26 and uses them to determine corner points of the bounding boxes. By traveling from the positions on the vertical reference bars 28, the path traveled to reach the corner points is reduced (i.e., the number of X-dimensions traveled is reduced) and this minimizes any deviation caused by a small error in the X-dimension or in the angle of the recognition pattern 26 with respect to a Cartesian coordinate system used for retrieval of information in the image stored by the reader 20.

The sensor 32 preferably includes a rectangular array of photosensitive elements such as CCDs. Each CCD element in the rectangular array preferably outputs a gray level signal ranging from 1–15, i.e., an analog signal that determines the amount of intensity of light impinging upon a particular pixel element. Alternatively, each pixel element in the array of the sensor 32 can output a binary signal indicating that the particular pixel element is either black or white. After the signals from the sensor 32 are approximately converted by the converter 34, the processor 36 stores the signals produced by the sensor in an image within a field of view of the sensor 32. As a result, the processor 36 may repeatedly analyze and manipulate the stored signals.

The reader 20 can be a hand-held product and can include a trigger switch 40 coupled to the processor 36. By actuating the trigger switch 40, the processor 36 causes the light source 22 to provide light to the symbol 24 that is reflected therefrom to the sensor 32. Since the processor 36 stores the signals that are output from the sensor 32 and converted by the converter 34, a user, by actuating the trigger switch 40, can cause the reader 20 to store an instantaneous image within the field of view of the reader 20, creating a snapshot of the symbol 24. The specific means and method for storing and locating an image of the symbol 24 are well known and will be understood by those in the relevant art without further need for description herein.

Figure 5:
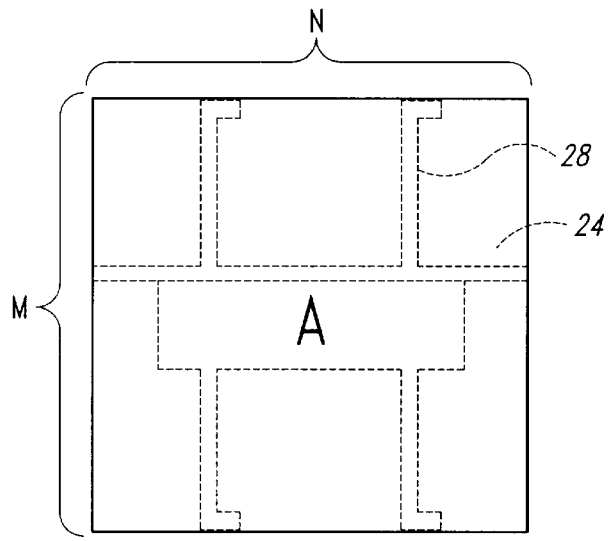
FIG. 5 is a schematic diagram of an area of a Code One symbol of FIG. 4.

The routine stored in the memory of processor 36 uses the instantaneous image stored in the reader 20 to define several bounding boxes for data areas in a data collection symbol, such as the Code One symbol 24. As shown in FIG. 5, the Code One symbol 24 has a total data area A. As mentioned above, optical distortion, particularly when imaging and storing the symbol 24, can cause the data area A to diverge significantly from a substantially square area standard in most Code One symbols. As a result, it can be particularly difficult for the reader 20 to locate the periphery of the data area A, and therefore difficult to locate the outer boundaries of the data area for the symbol 24.

The data encoded in area A of the symbol 24 can be represented by a series of sample points within the data area A, as represented by the following equation:

$$A = \{a_{i,j}\}_{i=0}^{M \cdot N}, \qquad (1)$$

where $a_i$ refers to the sample points within the data area A, and where the data area A has an area of M by N. The center recognition pattern area and the vertical reference bars, however, do not include encoded data. Under the present invention, the data area A of the symbol 24 is subdivided into several bounding boxes, shown as boxes $C_0$ through $C_K$ in FIG. 6.

The data area A, as divided into several boxes C, can be represented by the union of the boxes, as in the following equation:

$$A = \bigcup_{i=0}^{K} C_i. \tag{2}$$

Under equation (2), K represents the total number of boxes within the data area A, and the total number of sample points within each box $C_i$ is represented by the following equation:

$$C_i = \{a'_{i,\gamma}\}_{i=0,|\gamma=0,\ldots,K}^{T}, \tag{3}$$

where T represents the total number of sample points within a given box.

Figure 7:
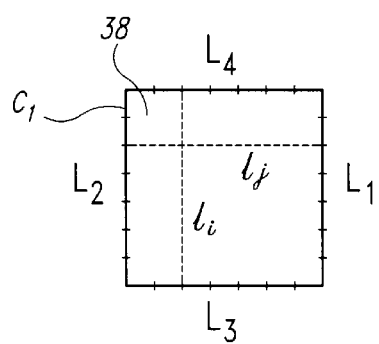
FIG. 7 is a schematic diagram of a block of FIG. 6 further divided by a series of lines for identifying data cells within a block.

The boxes $C_0$ through $C_K$ can then be further subdivided by defining regular points along sides $L_1$, $L_2$, $L_3$, and $L_4$ of the boxes, spaced apart by a distance equal to the X-dimension. Horizontal and vertical lines can then be drawn connecting opposite points, such as shown in FIG. 7 by exemplary lines $l_i$ and $l_j$. At the intersection of each line a sample point or "data cell" should exist. The data cells within the symbol 24 should be located within some or all of the boxes $C_1 \ldots C_k$, if they have been appropriately defined within the data area A so that the boxes totally fill the data area A without overlap, or without extending beyond the data area A. Individual data cells within each box $C_i$ can be defined and located by the intersection points of lines $l_i$ and $l_j$ where i and j are defined as follows:

$$i \in \{0, \ldots, N''-1\}$$
$$j \in \{0, \ldots, N'-1\}, \tag{4}$$

where N' refers to the number of points on left and right opposing lines $L_1$ and $L_2$ that divide these lines into regular intervals (such as the X-dimension), and where N" refers to the number of points on top and bottom opposing lines $L_3$ and $L_4$.

Figure 8A:
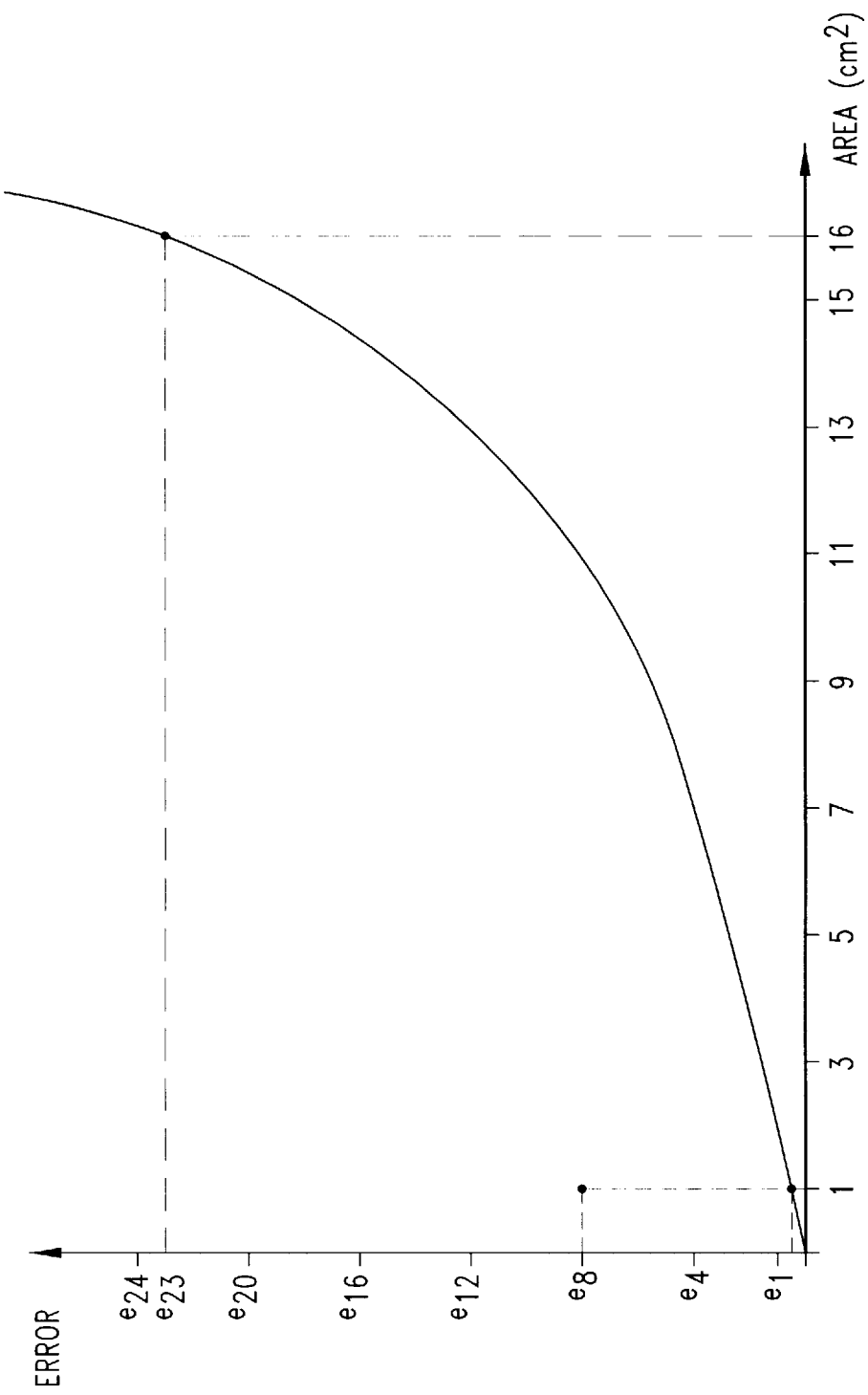
FIG. 8A is a graph of errors in decoding symbols per area.

The graph in FIG. 8A shows why the division of the data area A for the symbol 24 into several smaller boxes $C_i$ provides an improved method for locating the data area of a symbol. As shown by the curve in FIG. 8A, the number of errors due to geometric distortion of the boundary box non-linearly increases with the increase in the data area for a given symbol. For example, assuming that the data area A for the symbol 24 has an area of 16 square centimeters, then the total probability of errors in missing data cells within the symbol is approximately 23 ($e_{23}$), which has arbitrary units such as number of missed data cells during a given read of the symbol by the reader 20.

Figure 6:
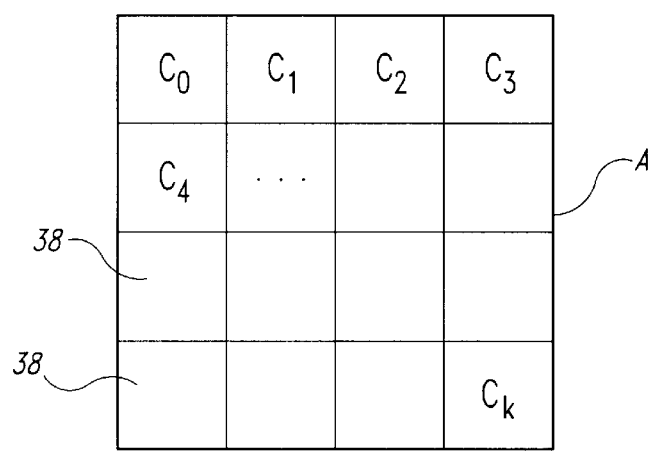
FIG. 6 is a schematic diagram showing the area of FIG. 5 subdivided into several blocks.

If the data area A of the symbol 24 is divided into several smaller boxes, such as 16 boxes as shown in FIG. 6, then each box has an area of approximately one square centimeter. The corresponding probability of error in reading data cells within the 1 cm² box is approximately $e_{1/2}$. Since there are a total of 16 of such boxes within the data area A (as shown in FIG. 6), the total probability of error is 16 times $e_{1/2}$, or $e_8$. Therefore, as shown in FIG. 8A, the probability of error within multiple smaller areas is substantially less than the probability of errors for the total area of the symbol 24 (8 errors as opposed to 23 for the area A). The faster increase in the number of errors in a larger area is because the errors propagate further into the increased area compared with the smaller area. Therefore, more errors will be created than if the areas are independent.

Mathematically, if we let the error samples in a subset box $C_i$ be equal to:

$$e_{C_i} = \sum_{i=0}^{K_{C_i}} \epsilon_i, \tag{5}$$

where $\epsilon_i$ is a missample at position i (e.g., a missed or misread data cell 30 in the symbol 24). If the ratio of error in an area and the area's maximum boundary, $$\max\{|L_1|, |L_2|, |L_3|, |L_4|\} \text{ is } \gamma_i = \frac{e_{C_i}}{\max(C_i)}, \tag{6}$$

then $e_{C_i} = \gamma \cdot \max(C_i)$ where $L_1$, $L_2$, $L_3$, and $L_4$ are the boundary lengths. Considering all boxes within the data area A, the total error $e_d$ is the following:

$$e_d = \sum_{i=0}^{K_{C_i}} e_{C_i} = \sum_{i=0}^{K_{C_i}} \max(C_i) \cdot \gamma_i \tag{7}$$

where $\max(C_i)$ corresponds to the maximum boundary for a given subset box, while $\gamma$ is an appropriate factor. If all of the boxes have the same size, then:

$$e_d = K \cdot \max(C_0) \cdot \gamma \tag{8}$$

Considering now the total, undivided data area A, the total error for this data area is equal to the following equation:

$$e_u = \max_{|A|} * \gamma', \tag{9}$$

where $\gamma'$ is the new ratio factor, and $\gamma' > \gamma$ since the error rate is higher for an area with larger dimensions than the smaller ones. As a result, even if $\max(A) = \max(C_0) \cdot K$, the total error is within a smaller area is much less than that of a larger area when attempting to locate data cells within the data area of a given symbol. The fact is, by dividing a large box into smaller ones, the errors in the smaller ones sum up to the total error while the ratio factor $\gamma$ is small. On the other hand, when the box area dimension increases, the ratio factor $\gamma$ increases faster with respect to the dimension increase, resulting in larger total error.

Figure 1:
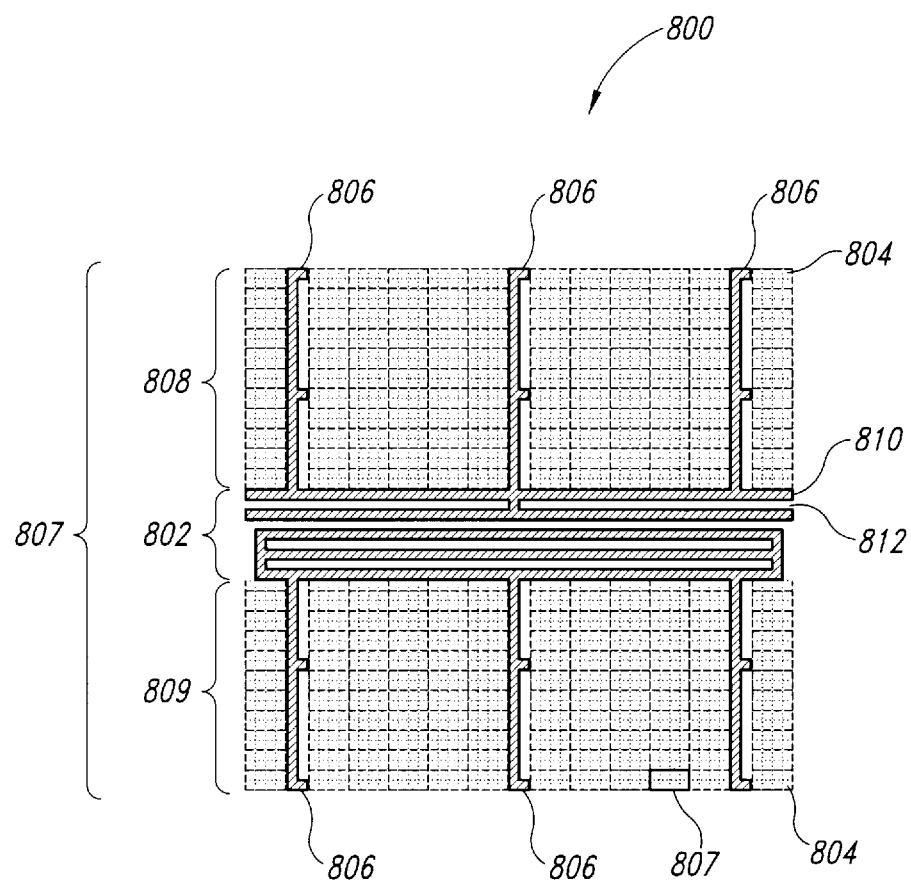
FIG. 1 shows a Version E Code One symbol.
Figure 2:
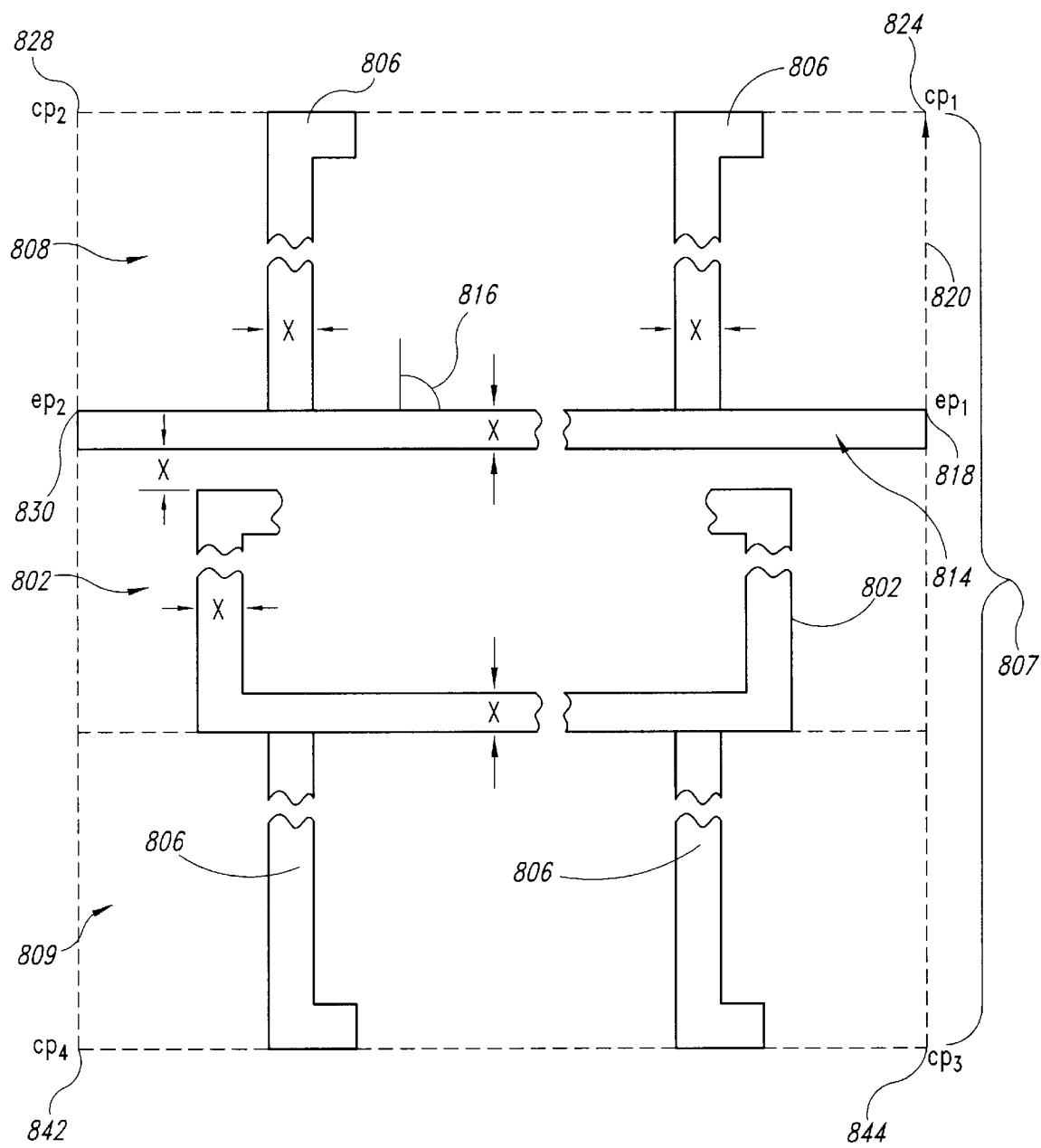
FIG. 2 is a schematic diagram of a Code One recognition pattern that shows an example of a conventional method for determining a bounding box of a Code One symbol.
Figure 3:
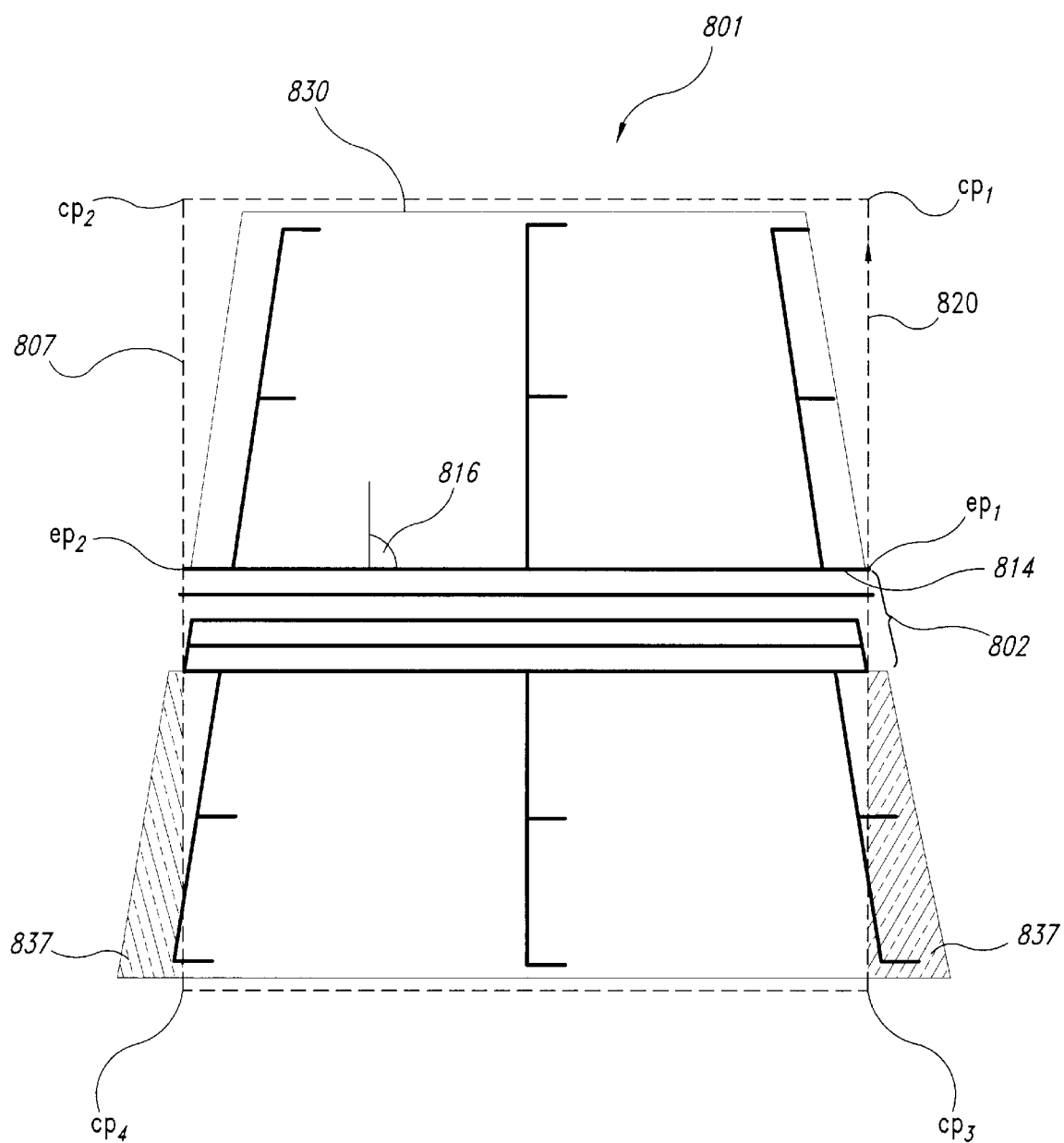
FIG. 3 is a schematic diagram of an optically distorted image of a version E Code One symbol as stored by an imaging device that is misaligned and tilted with respect to the symbol.
Figure 8B:
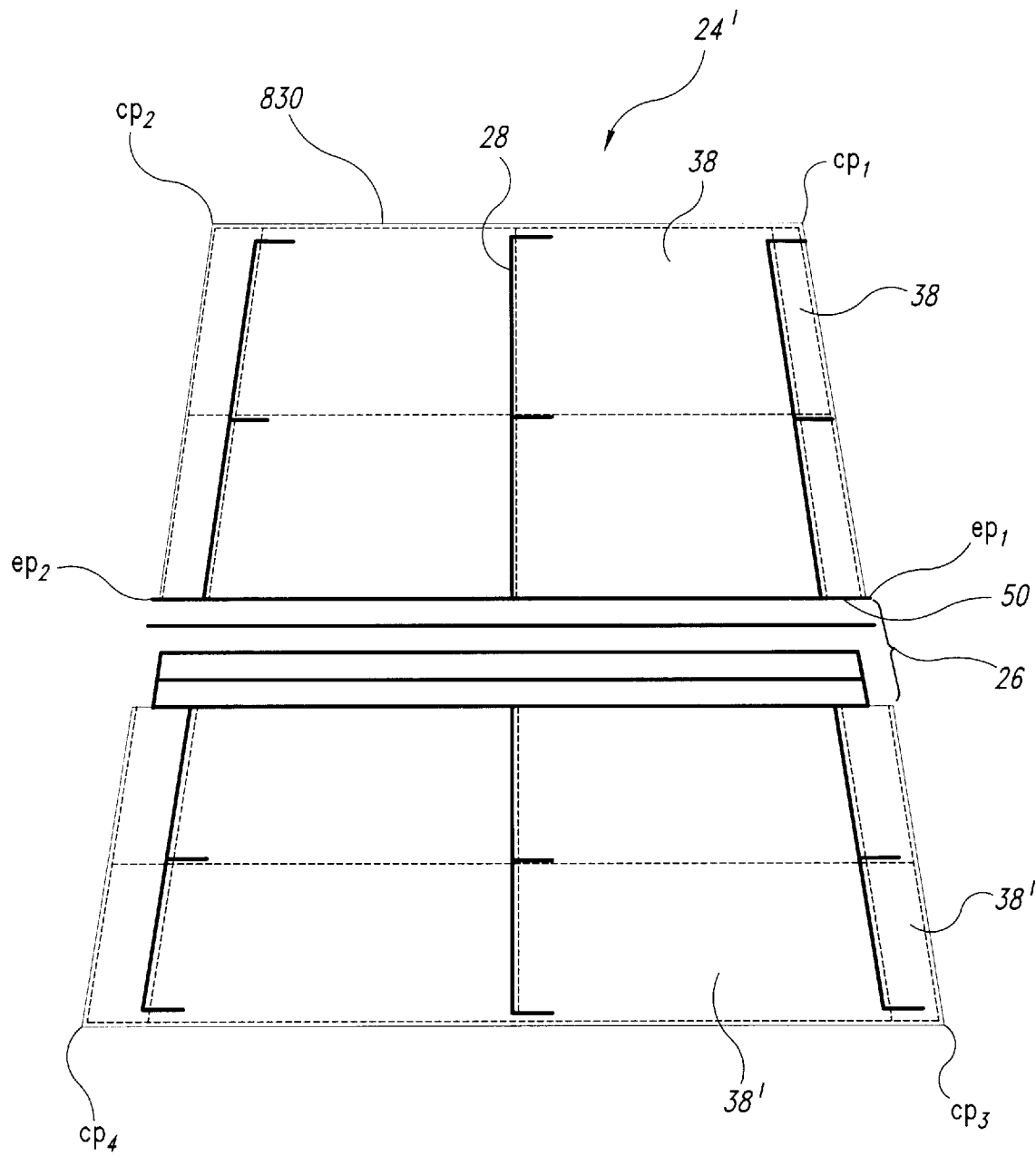
FIG. 8B is a schematic diagram, similar to FIG. 3, of an optically distorted image of a version E Code One symbol whose area has been subdivided into a series of blocks under the method of the present invention.

The present invention applies these principles. As shown in FIG. 8B, by dividing the symbol 25 into eight upper bounding boxes 38, and eight lower bounding boxes 38', these bounding boxes are able to accurately define the boundaries of the upper and lower data areas 60 and 70 for the symbol. Comparing 8B to FIG. 3, the information located in shaded areas 387 of FIG. 3 are included within the bounding boxes of FIG. 8B.

Figure 9:
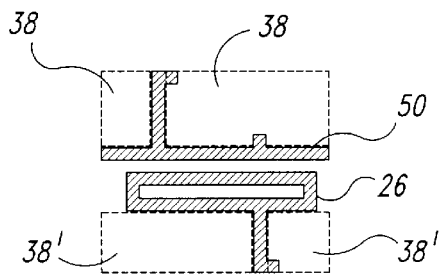
FIG. 9 is a version A Code One symbol whose data area is enclosed by four bounding boxes.
Figure 10:
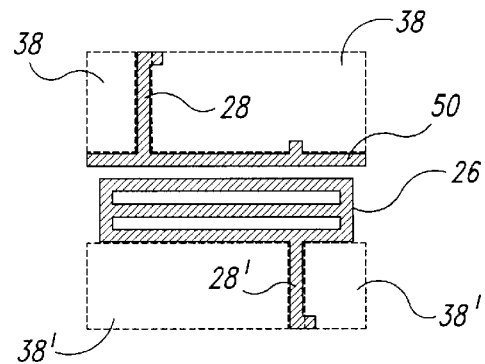
FIG. 10 is a version B Code One symbol whose data area is enclosed by four bounding boxes.
Figure 11:
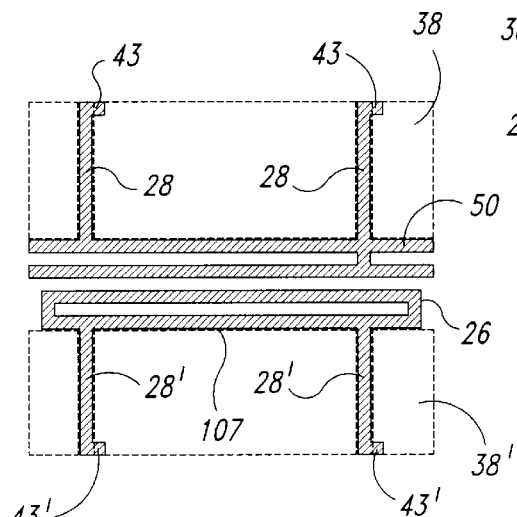
FIG. 11 is a version C Code One symbol whose data area is enclosed by six bounding boxes.
Figure 12A:
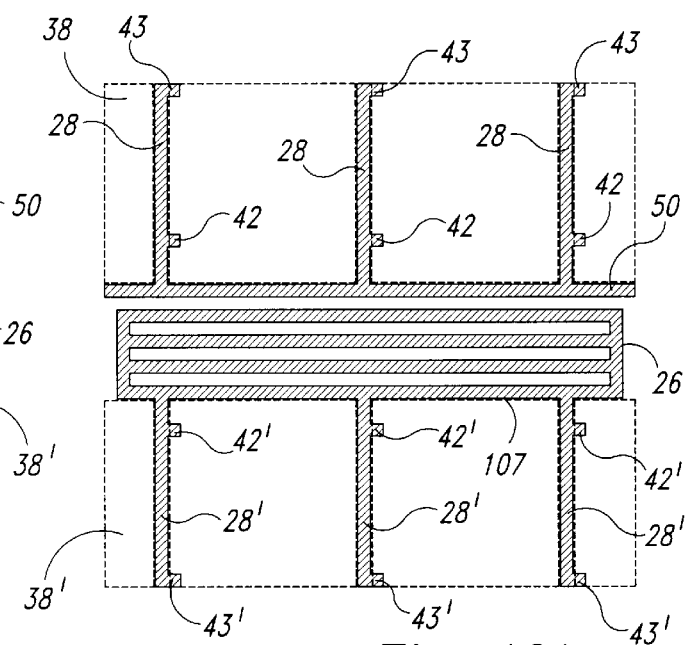
FIG. 12A is a version D Code One symbol whose data area is enclosed by eight bounding boxes.
Figure 12B:
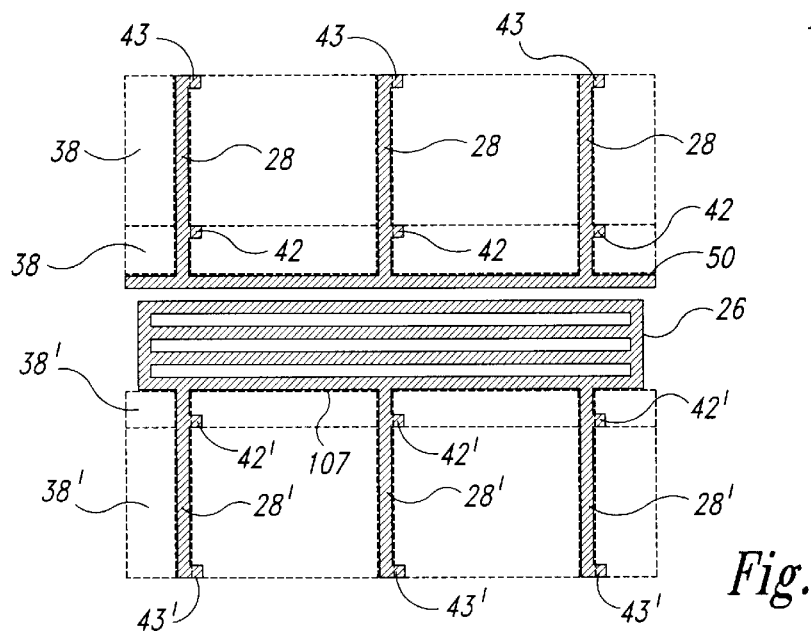
FIG. 12B is a version D Code One symbol whose data area is enclosed by sixteen bounding boxes.
Figure 13:
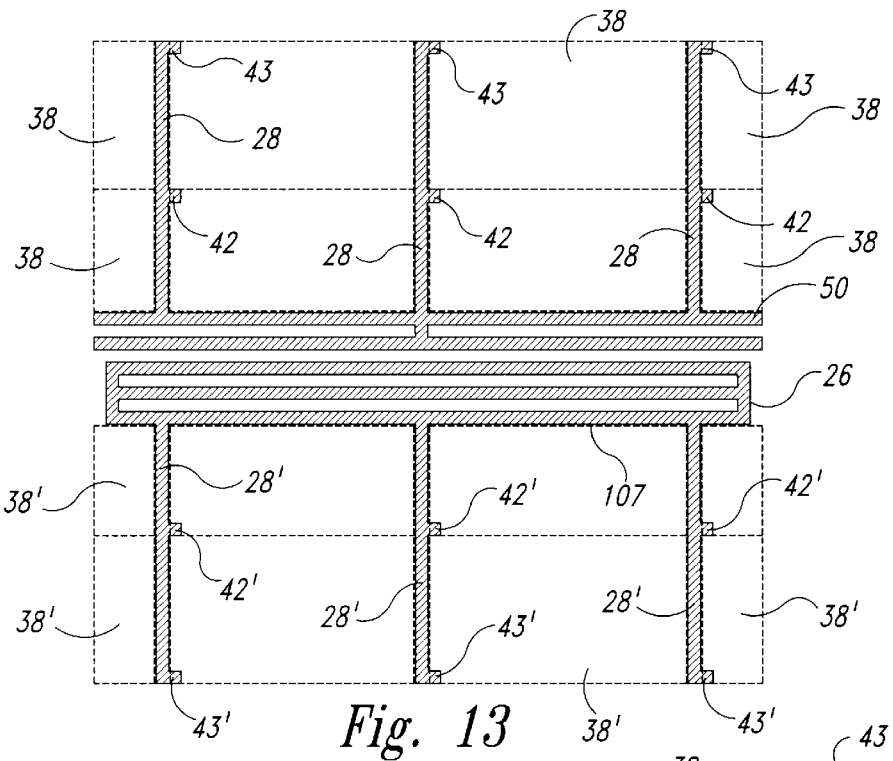
FIG. 13 is a version E Code One symbol whose data area is enclosed by sixteen bounding boxes.
Figure 14:
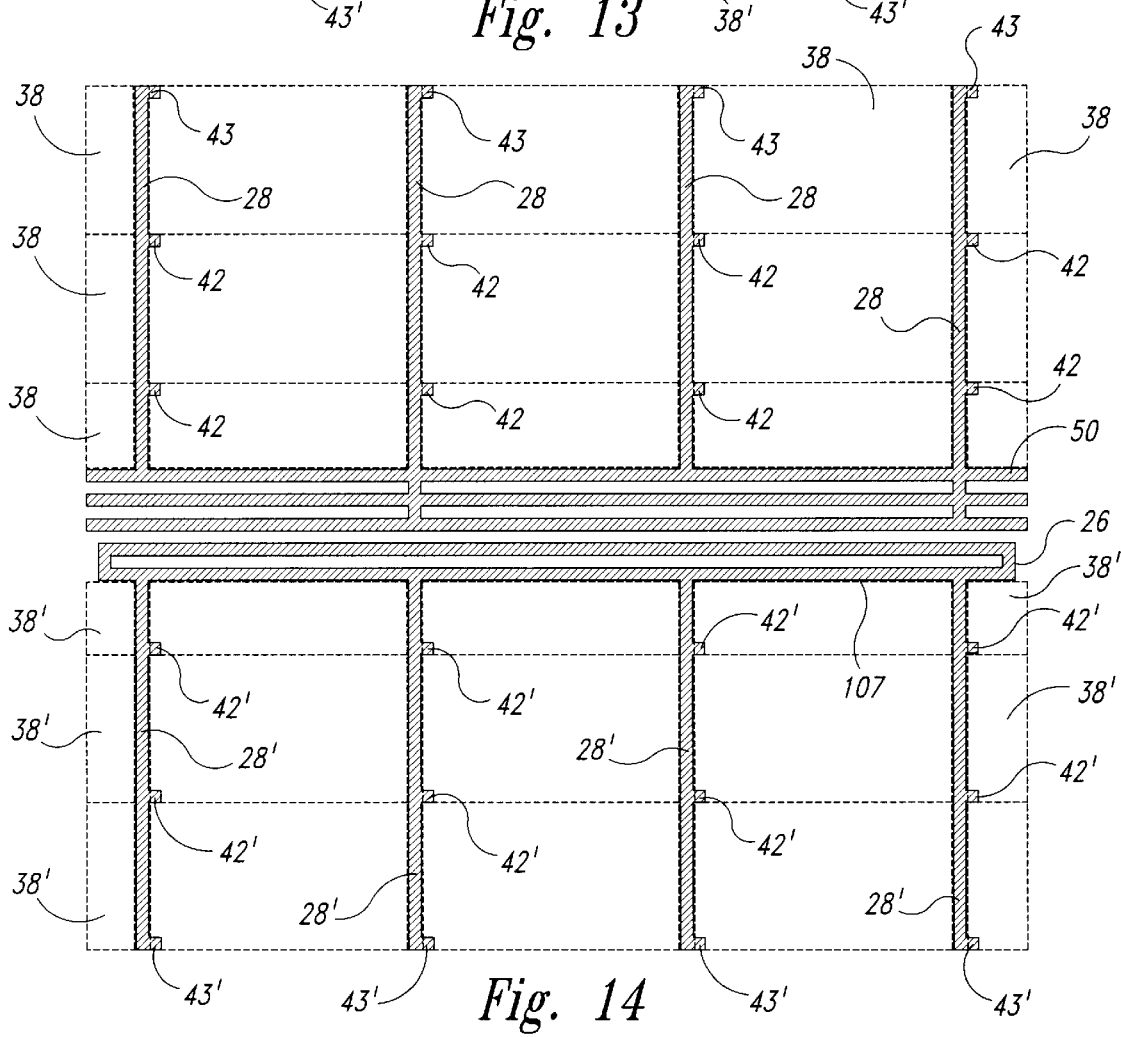
FIG. 14 is a version F Code One symbol whose data area is enclosed by thirty bounding boxes.

The present invention defines a number of bounding boxes depending upon the version of the symbol. Therefore, referring to FIGS. 9 and 10, the present invention defines four bounding boxes for version A and B Code One symbols (two upper bounding boxes 38 and two lower bounding boxes 38'). Referring to FIG. 11, the present invention defines six bounding boxes for version C Code One symbols. The present invention preferably defines sixteen bounding boxes for version D Code One symbols, as shown in FIG. 12B. However, to reduce processing load on the processor 36, the present invention can define only eight bounding boxes for version D Code One symbols, as shown in FIG. 12A. The present invention defines sixteen bounding boxes for version E Code One symbols, as shown in FIG. 13, and thirty bounding boxes for version F Code One symbols, as shown in FIG. 14.

Figure 15A:
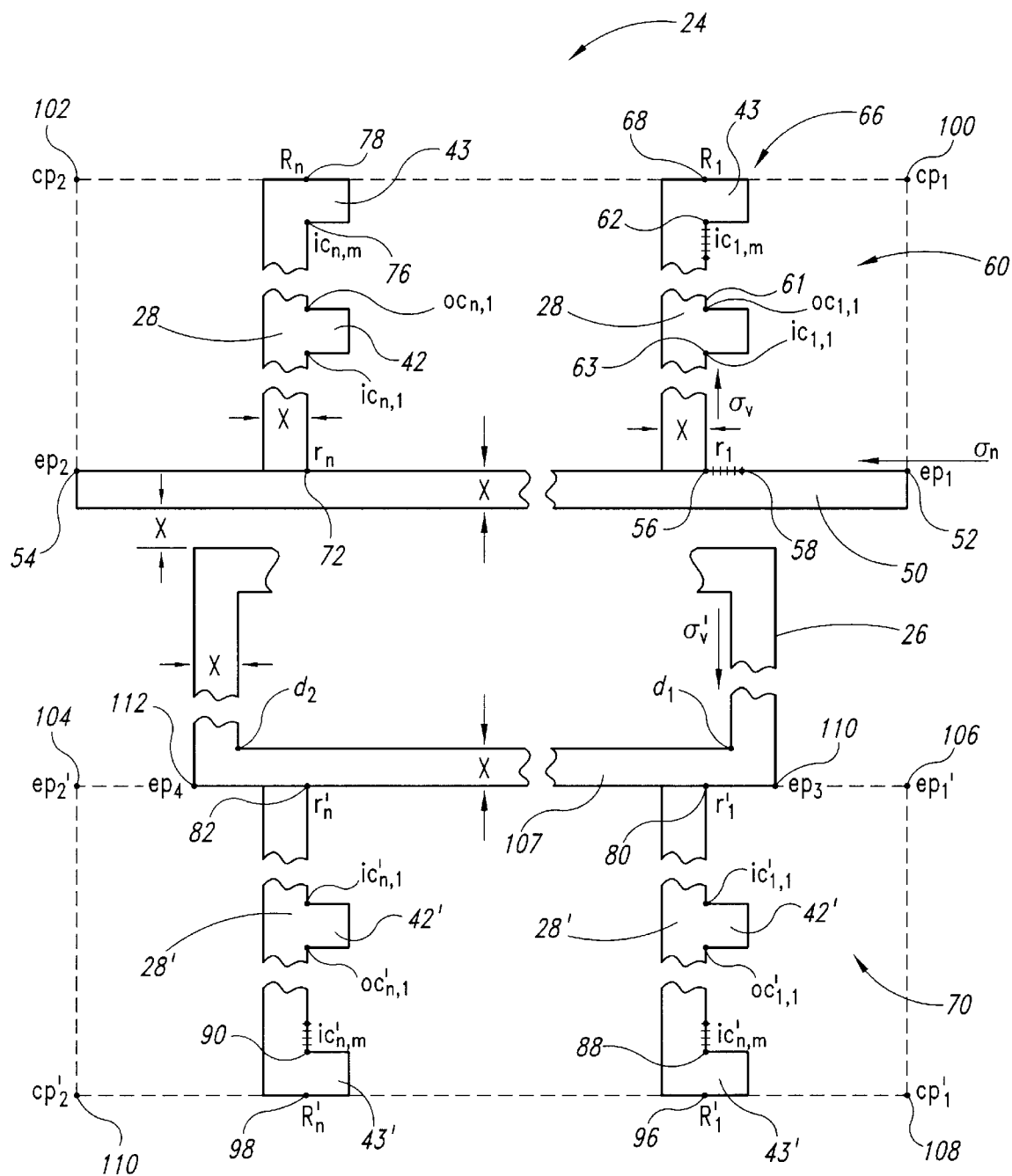
FIG. 15A is a schematic diagram of a Code One recognition pattern that shows a method of accurately determining the bounding box of a Code One symbol.

Referring to FIG. 15A, the method for locating and dividing the data area of the symbol 24 begins by first locating its recognition pattern 26 using known techniques. The recognition pattern 26 in Code One symbols varies depending upon the version of the particular symbol. In general, the number of bars and spaces in the recognition pattern, and the number of top long bars, determines the version of the symbol. By knowing the version, the processor 36 can determine the number of vertical reference patterns 28 and blocks 42.

After locating the recognition pattern 26 and determining the version of the symbol 24, the processor 36 locates the position of the top long bar 50 of the recognition pattern 26 and the locations of each of its upper end points $ep_1(52)$ and $ep_2(54)$ are determined by image processing methods well known in the art. Once the end points $ep_1(52)$ and $ep_2(54)$ have been determined, a first upper root point $r_1(56)$ the vertical reference pattern 28 that is in the upper right corner of the symbol 24 (as the symbol is oriented, as shown in FIG. 15A and the top long bar 50 is found by beginning the start of a searching process, at a starting point 58 which is a number Z of X-dimensions in a direction $\sigma_H$. The direction $\sigma_H$ is defined as the direction along a top edge of the top long bar 50. For a version A or B Code One symbol, the value of Z can be 3.5, while for the remaining versions of Code One symbols, Z can be 5.5.

From the starting point 58, a search, as is well known in the art, continues along the direction $\sigma_H$ until the processor 36 encounters a sharp edge angle change. The edge angle is the gradient direction angle at the edge point. The gradient direction angle refers to the distance of greatest change in pixel intensity from a given pixel with respect to the edge direction at that pixel or point. In the present invention, the gradient direction angle at a given point is generally perpendicular to the edge of a bar or other feature in the symbol at that point. The angle change is then tested by the processor 36 to determine if the area causing the abrupt change has a width less than 50% of the X-dimension, if it does, then the search continues since the change would most likely be an aberration, distortion, printing defect, etc., and not the root point of the vertical reference pattern 28. Once the 50% width is exceeded and the root point 56 has been located, the direction of travel $\sigma_H$ is changed to a direction $\sigma_v$, along an inner edge 61 of the upper right most vertical reference pattern 28. In general, as shown in the figures herein, incremental "traveling" refers generally to sampling pixel after pixel in the stored image, are shown as small hash marks, such as the marks along an outer edge of long bar 50, vertical reference bars 28, etc., in the symbol 24.

Thereafter, the processor 36 samples the vertical reference pattern 28 for an inner corner point ic between one or more blocks 42 and the vertical reference pattern. Starting from the root point 56 or another selected point, the processor 36 incrementally searches along the new direction $\sigma_v$ until the processor encounters a sharp angle indicating that it has reached a first upper inner corner point $ic_{1,1}(63)$. The processor 60 can also start from another selected point that is a predetermined number of X-dimensions from the root point 56, depending upon the version of the Code One symbol 24. Under either method, once the inner corner point is located, the processor 36 determines an angle $\Theta_1$ (approximately equal to $\sigma_v$) that the vertical reference bar 28 makes with the top long bar 50, and in a direction of this angle, the processor proceeds across the upper block 42 to locate an outer corner point $oc_{1,1}$. Thereafter the processor 36 continues incrementally searching in the direction $\sigma_v$ along the edge of vertical reference bar 28 and stores the positions of all upper inner and outer corner points $ic_{i,j}$ and $oc_{i,j}$ for other blocks 42 along the vertical reference pattern, including an inner corner 62 at the free end of the upper right vertical reference pattern. Thereafter, the processor 36 proceeds in the direction $\Theta_1$ across the last block 42 forming a foot 66 of the vertical reference pattern 28 until a position of a top point $R_1(68)$ has been determined.

Thereafter, process continues to locate root, corner, and top points for each vertical bar 28, including locating a last upper root point $r_n(72)$, inner corner points $ic_{n,1}(72)$ through $ic_{n,m}(76)$, outer corner points $oc_{n,1}$ through $oc_{n,m}$, and top point $R_n(78)$ of a left upper vertical reference bar. Alternatively, the processor 60 can first locate all of the upper root points $r_1(56)$ through $r_n(72)$, and then locate the upper inner and outer corner points $ic_{1,1}$ through $ic_{n,m}$, and $oc_{1,1}$ through $oc_{m,n}$ and thereafter locate the top points $R_1$ through $R_n$ for each of the vertical reference bars 28. In general, the symbol 24 has a number n of vertical reference bars 28, where each vertical reference bar has m number of blocks 42 extending therefrom. Also, as used generally herein, i refers to a particular vertical reference bar 28 1, . . . , n while j refers to a particular block or "layer" 1, . . . , n for one or more vertical reference bars. Objects and elements in the upper data region 60 are generally designated by a prime symbol ("'") for the similar objects or elements in the lower data region 70, below the recognition pattern 26 (except when used with subscripts).

To locate reference points used to determine bounding boxes below the recognition pattern 26, the processor 36 uses the upper root points $r_1(56)$ through $r_n(72)$ of the vertical reference patterns 28 above the recognition pattern. Initially, lower root points $r'_1(80)$ through $r'_n(82)$ (of respective rightmost and leftmost vertical reference patterns 28 of a lower data area 70) are found by moving from the root point $r_1(56)$ to the root $r'_1(80)$, from the root $r_n(72)$ to the root $r'_n(82)$, and likewise for the intermediate root points, in a direction $\Theta'_n$, which is 180° from the angle $\Theta_n$ for each upper vertical reference bar 28. The path along the direction $\Theta'_n$ initially traverses the recognition pattern 26 a distance of Z X-dimensions downward. The value of Z is determined based on the number of bars and spaces, each having a width of an X-dimension, within the version of the Code One symbol being decoded. Alternatively, after locating the first lower root point $r'_1(80)$, the remaining lower root points through point $r'_n(82)$ can be found by traversing in the direction $\sigma_H$ along the bottom bar 107. Alternatively, the lower root points $r'_1(80)$ through $r'_n(82)$ can be found by traversing from end points $d_1$ and $d_2$, respectively, a predetermined number of X-dimensions in an outward direction from the symbol along the lowest bar 107 of recognition pattern 26 and then traversing one X-dimension vertically down across the bar. The end points $d_1$ and $d_2$ are points found at the lower, inner corners of the recognition pattern 26, as shown in FIG. 15A.

Once the lower root points $r'_1(80)$ through $r'_n(82)$ have been determined, the processor 36 incrementally searches along each of the lower vertical reference bars 28' until a sharp angle is encountered indicating that lower inner corner points $ic'_{1,1}$ through $ic'_{n,1}$ have been reached. Once the lower corner points, including points $ic'_{1,m}(88)$ through $ic'_{n,m}(90)$ have been located, the processor 36 continues the path along direction $\Theta'_n$ across blocks 42' to locate outer corner points $oc'_{1,1}$ through $oc'_{m,n}$ and across feet 92 through 94 to locate bottom points $R'_1(96)$ through $R'_n(98)$.

Thereafter, the processor 36 locates the lowest short bar 107 of the recognition pattern 26 and both of its end points $ep_3(110)$ and $ep_4(112)$ are located by methods well known in the art. The processor 36 then computes end points $ep'_1$ and $ep'_2$, which are end points of the lower bar 107 if it had the same length as the upper bar 50. End points $ep'_1$ and $ep'_2$ are determined by a method described in more detail below. Points $ep'_1(106)$ and $ep'_2(104)$ are essentially determined by continuing along a line $$\overrightarrow{ep_3 ep_4}$$

some predetermined number of X-dimensions (e.g., 2) that are characteristic of the number of data cells typically extending beyond that portion of the short bar 108 for the chosen version of the symbology.

Thereafter, the processor 36 fits a vertical line function for each vertical reference bar 28 and 28' based on the upper and lower root points $r_1$ through $r_n$ and $r'_1$ through $r'_n$, top points $R_1$ through $R_n$, bottom points $R'_1$, through $R'_n$, and upper and lower outer corner points $oc_{1,1}$ through $oc_{n,m}$ and $oc'_{1,1}$ through $oc'_{n,m}$. The processor 36 then determines if the outer corner points, top points, and bottom points are collinear for a given value of j, and if they are, determines functions for horizontal lines passing through all collinear top points, bottom points, and outer corner points within a given "layer," i.e., having a common j subscript.

Figure 15B:
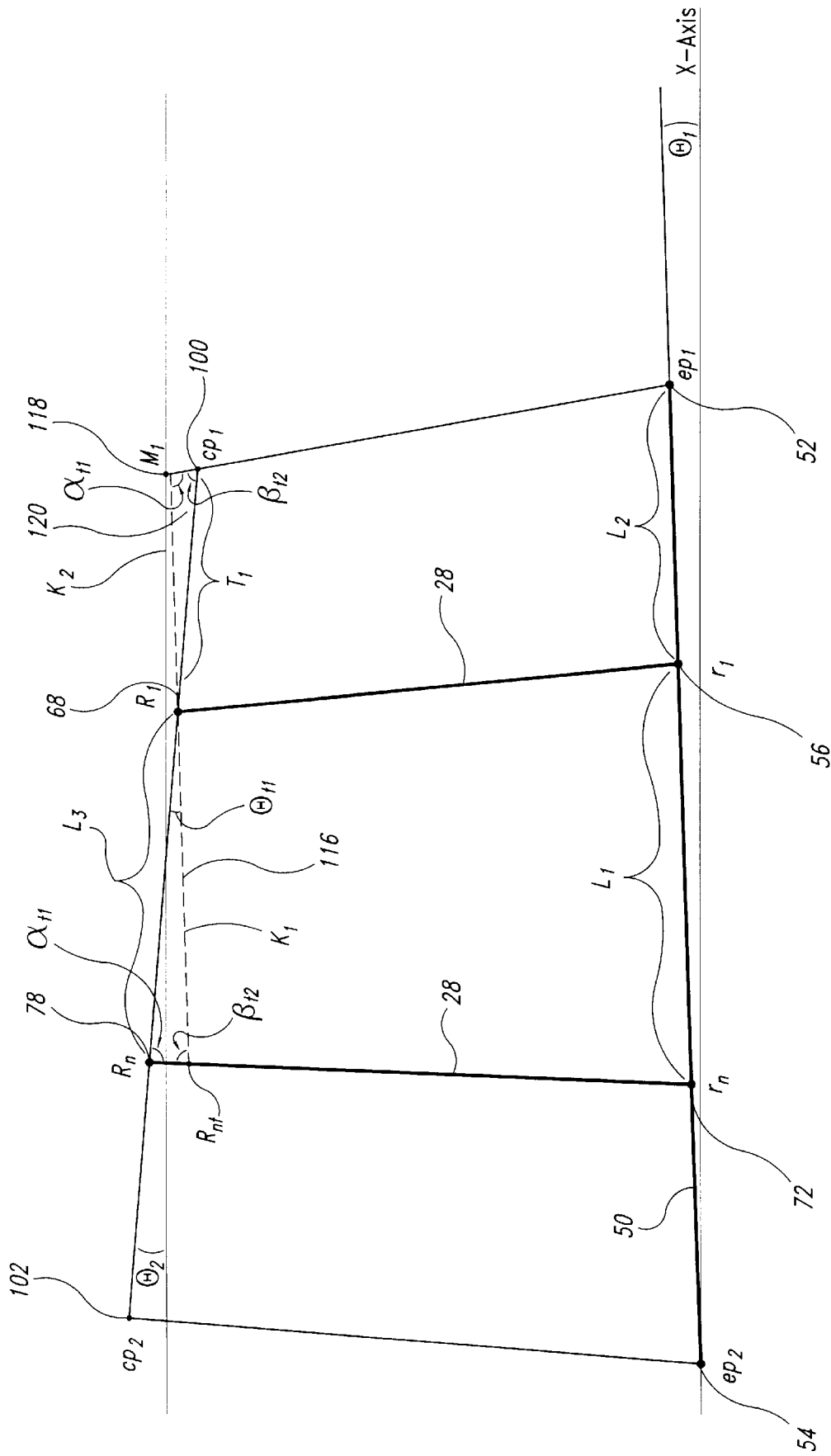
FIG. 15B is a schematic diagram that shows an example of determining a first corner point $cp_1$ for an upper data region of the symbol of FIG. 15A.

Once all reference or "landmark" points have been determined and horizontal and vertical lines calculated, the next step is to determine any angular distortion of the symbol 24 and determine corner points $cp_1(100)$, $cp_2(102)$, $cp'_1(108)$ and $cp'_2(110)$. First, as shown in FIG. 15B, the processor 36 determines an angle $\Theta_1$ between the line connecting end point $ep_1(52)$ and end point $ep_2(54)$ with respect to the Cartesian coordinates of the image information retrieval system. Then, the processor 36 determines an angle $\Theta_2$ of a line connecting top points $R_1(68)$ and $R_n(78)$ (or two suitable, collinear top points) with respect to the Cartesian coordinate system. Finally, an angle of distortion $\Theta$ is calculated using the equation: $\Theta = \Theta_2 - \Theta_1$.

Upper right corner point $(cp_1)100$ is determined by continuing along the path of a line $$\overrightarrow{R_n R_1}$$

for some length $T_1$. The length $T_1$ is calculated as follows:

$$T_1 = \frac{L_3 \cdot L_2}{L_1} \cdot \frac{\sin\alpha_{t1}}{\sin\beta_{t1}} \cdot \frac{\sin\alpha_{t2}}{\sin\beta_{t2}} \tag{10}$$

where $L_1$, $L_2$, $L_3$ are lengths of lines $$\overrightarrow{r_n r_1}, \overrightarrow{r_1 ep_1}, \text{ and } \overrightarrow{R_n R_1},$$

respectively. The angles $\alpha_{t1}$, $\beta_{t1}$, $\alpha_{t2}$, $\beta_{t2}$ are as shown in FIG. 15B.

Figure 15C:
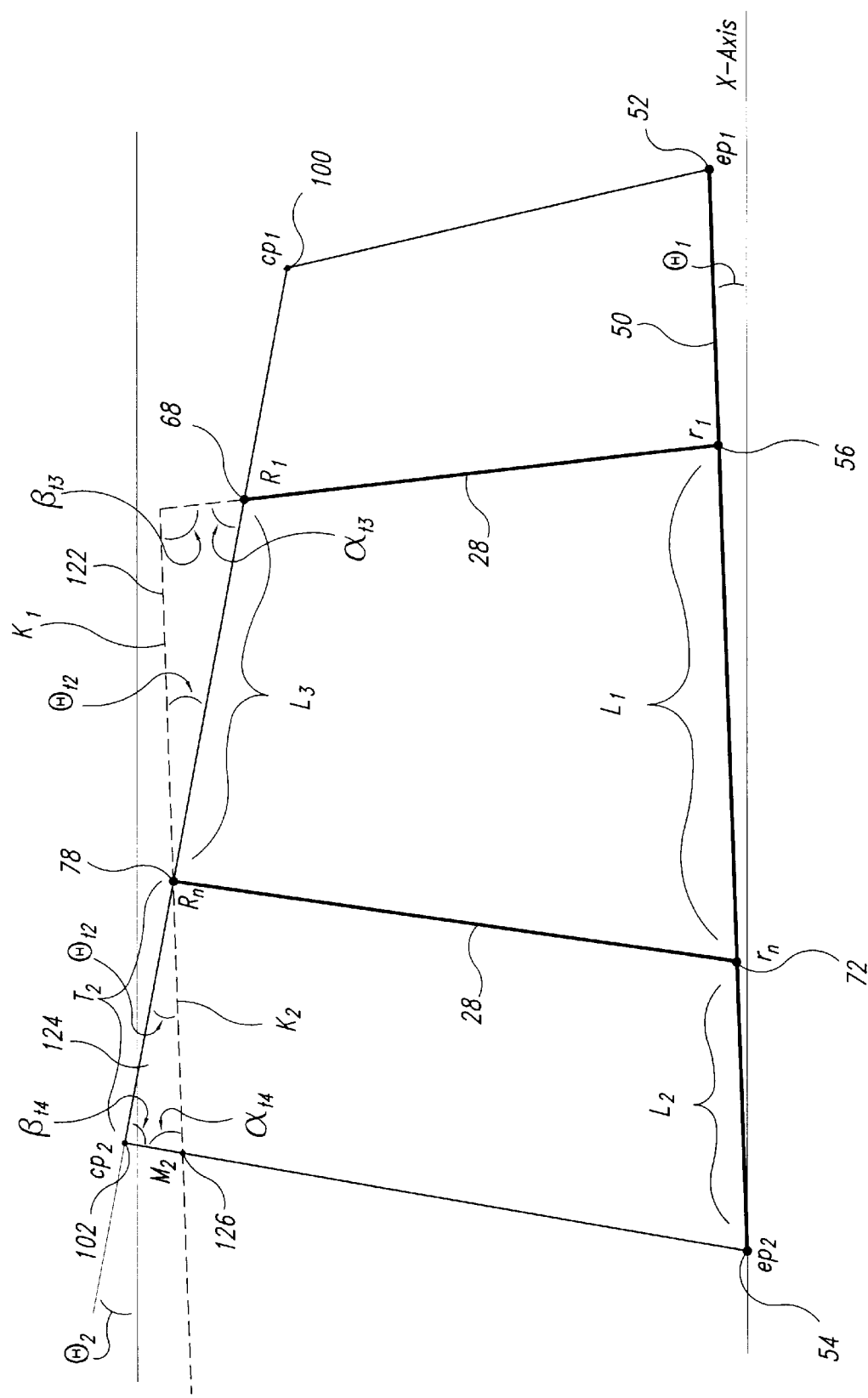
FIG. 15C is a schematic diagram that shows an example of determining a second corner point $cp_2$ of the upper data region of the symbol of FIG. 15A.

Upper left corner point $cp_2(102)$ is calculated in a similar manner, as shown in FIG. 15C. The corner point $cp_2(102)$ is determined by continuing along the path of line $$\overrightarrow{R_1 R_2}$$

for some length $T_2$. The length $T_2$ is calculated as follows:

$$T_2 = \frac{L_{3'} \cdot L_{2'}}{L_{1'}} \cdot \frac{\sin\alpha_{t3}}{\sin\beta_{t3}} \cdot \frac{\sin\alpha_{t4}}{\sin\beta_{t4}} \tag{11}$$

where $L_{1'}$, $L_{2'}$, $L_{3'}$ are the lengths of lines $$\overrightarrow{r_n r_1}, \overrightarrow{ep_2 r_n}, \text{ and } \overrightarrow{R_n R_1},$$

and angles $\alpha_{t3}$, $\beta_{t3}$, $\alpha_{t4}$, $\beta_{t4}$ are as shown in FIG. 15C.

Regarding the lower bounding boxes 38' for the symbol 24, corner points $cp'_1(108)$ and $cp'_2(110)$ are found in a manner identical to finding corner points $cp_1$ and $cp_2$ by continuing along lines $$\overrightarrow{R'_n R'_1}, \text{ and } \overrightarrow{R'_1 R'_n},$$

all respectively.

Once the processor 36 has determined all of the root points $r_1$ through $r_n$, top points $R_1$ through $R_n$, outer corner points $oc_{1,1}$ through $oc_{n,m}$ and corner points $cp_1(100)$, $cp_2(102)$ in the upper data region 60, and root points $r'_1$ and $r'_n$, bottom points $R'_1$ through $R'_n$, outer corner points $oc'_{1,1}$ through $oc'_{n,m}$ and corner points $cp'_1(108)$ and $cp'_2(110)$ for the lower data region 70, all of the landmark or reference points for the symbol 24 are found.

Thereafter, the processor 36 performs linear fitting operations to join collinear points to thereby divide the upper and lower data regions 60 and 70 into several upper and lower bounding boxes 38 and 38'. For example, upper bounding boxes 38 are completed by lines equations between end point $ep_1(52)$ and corner point $cp_1(100)$, and corner point $cp_2(102)$ and end point $ep_2(54)$. The line functions determined above are then extended to these lines to complete all of the upper bounding boxes 38 for the symbol 24. In this manner all the data cells within the symbology can be located and analyzed, thus minimizing deviations due to small errors in either the calculation of the X-dimension or distortions of the symbology.

The processor 36 (FIG. 4) is controlled by software that is stored as a series of program instructions in the memory of the processor 36 to perform the above-described process for defining the upper and lower bounding boxes 38 and 38' of the symbol 24. Flowcharts from which a source code can be written by one skilled in the art are illustrated in FIGS. 16–23.

Figure 16:
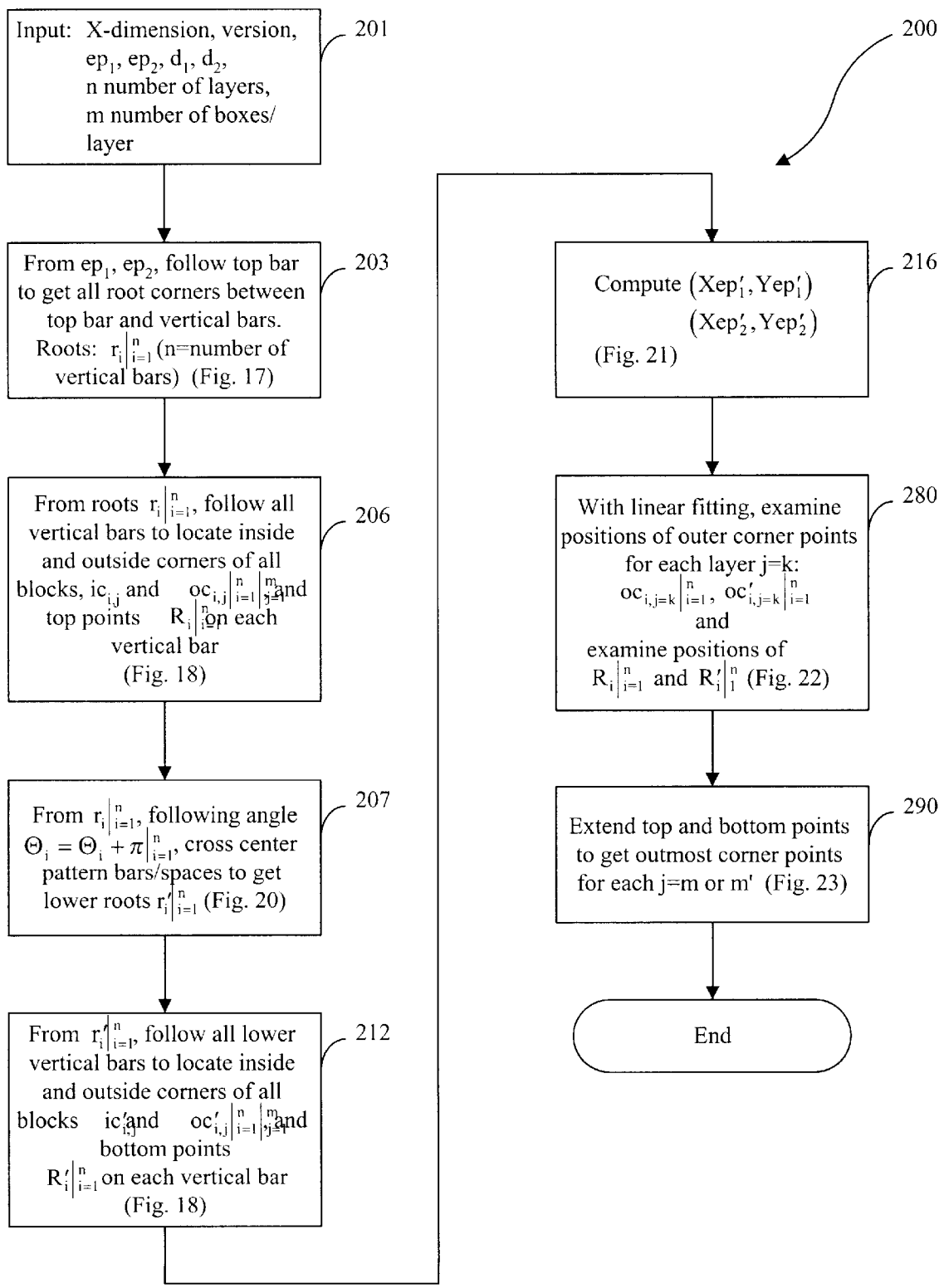
FIG. 16 is a flowchart which shows a main program implementing an exemplary method used to determine the bounding box of a symbol.

Referring to FIG. 16, a main routine 200, which is executed by processor 36, begins in step 201 by inputting to the processor an X-dimension of the symbol 24. The X-dimension is preferably computed under the inventor's application Ser. No. 08/524,368, filed Sep. 6, 1995, entitled Orientation Independent Method For Robust Computation Of X-dimensions, now U.S. Pat. No. 5,565,669, incorporated herein by reference. Additionally, in step 201, the version of the symbol 24, end points $ep_1(52)$, $ep_2(54)$, $ep_3(110)$, and $ep_4(112)$, are independently input by an operator or automatically determined by analyzing the recognition pattern 26 by methods well known in the art as noted above.

In step 202, the processor 36 follows a top of the long bar 50 until it determines the locations of all of the root points $r_1(56)$ through $r_n(72)$. The processor 36 determines the locations of the corner points by invoking a corner finding subroutine 450, as shown in FIG. 17.

Figure 17:
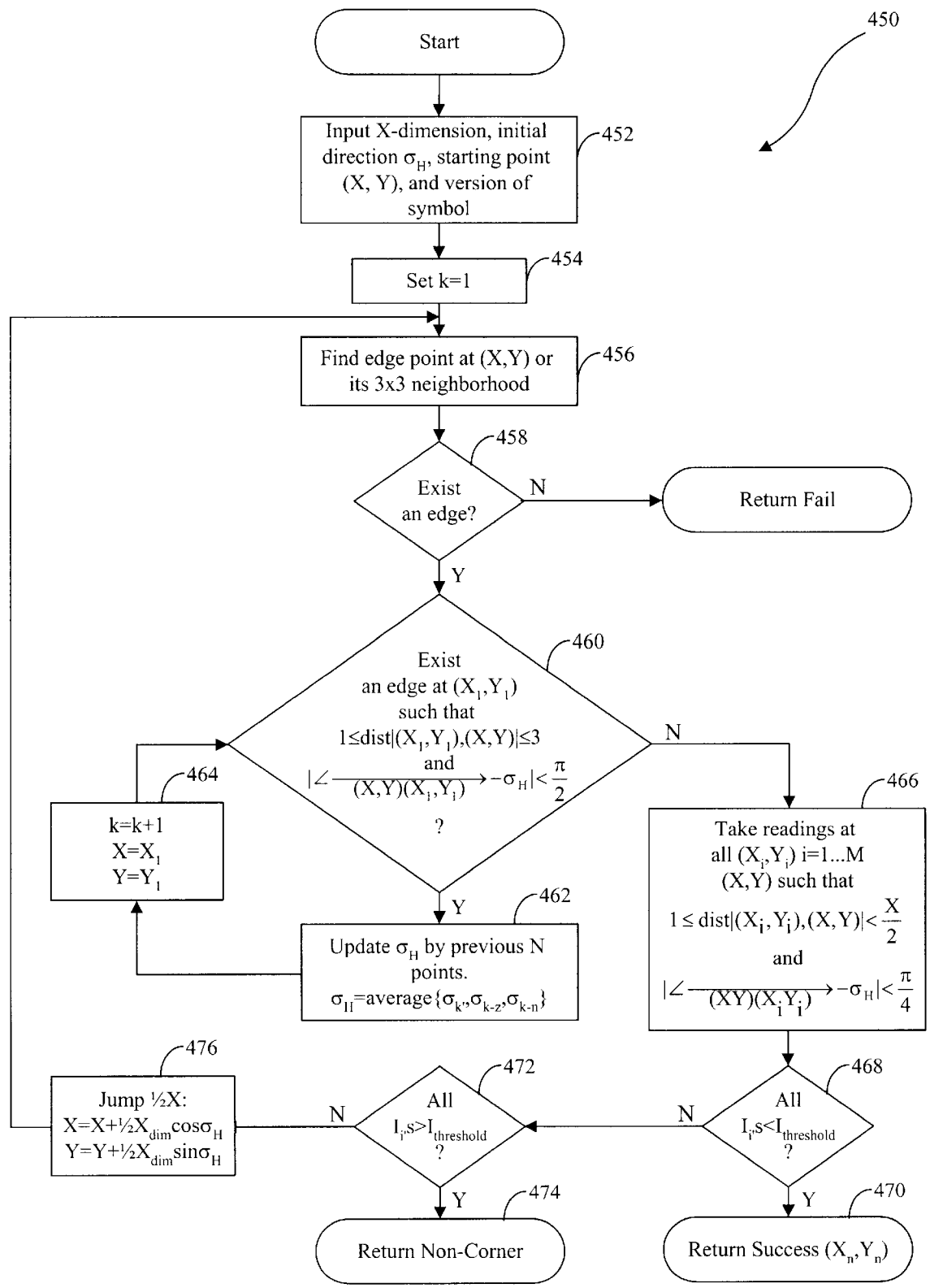
FIG. 17 is a flowchart of a subroutine in the first embodiment used to locate root points between a top long bar and vertical reference bars extending therefrom in the symbol of FIG. 15A.

Referring to FIG. 17, the processor 36 in an initial step 452 of subroutine 450 inputs the X-dimension of the symbol 24, which has been previously determined. The processor 36 in step 452 also inputs the version of the symbol 24 and the X and Y axis coordinates of a starting point (X, Y) on the top long bar 50, and inputs an initial direction of sampling $\sigma_H$ that is dependent on which root point is being sought. Initially, the direction $\sigma_H$ shown in FIG. 15A is input to determine the rightmost upper corner point $r_1(56)$. Next, in step 454, the processor 36 initializes a variable k to a value of 1 (k=1), where k represents the number of samples the processor 36 has made along the direction $\sigma_H$. In step 456, the processor 36 seeks an edge point at some point (X, Y) or its neighborhood, preferably a 3×3 pixel neighborhood, in the Cartesian coordinate system, as is well known in the art and described in A. Rosenfeld, *Digital Picture Processing*, Academic Press, Volume 1 and Volume 2, 1982, incorporated by reference herein.

In step 458 the processor 36 determines if there is an edge within any of the 3×3 pixel area examined, if not, then the processor 36 returns to the main routine 200 and indicates on a user display (not shown) that a failure has occurred. However, if the processor 36 found that an edge does exist, then it proceeds to step 460. In step 460 the processor 36 checks whether an edge exists at a next point $(X_1, Y_1)$ out of the points in the 3×3 pixel area surrounding the current point (X, Y) that are stored in memory, and tests this point against conditions:

$$1 \leq dist|(X_1, Y_1),(X, Y)| \leq 3; \quad (12)$$

and $$\left| \angle \overrightarrow{(X,Y)(X_1,Y_1)} - \sigma_H \right| < \pi/2$$

As used generally herein, the symbol $$\angle \overrightarrow{(X,Y)(X_1,Y_1)}$$

refers to the angle that a line between points (X, Y) and $(X_1, Y_1)$ makes with respect to the X axis of the Cartesian coordinate system employed by the present invention. Additionally, "dist" refers to determining the distance between two points using the well-known distance formula recited below. If the edge of the point $(X_1, Y_1)$ is between 1 and 3 pixels away, and the edge is not at a point less than 90° from the direction of travel $\sigma_H$, then the processor 36 proceeds to step 462.

In step 462, the processor updates the direction $\sigma_H$ by a linking history of N previous points, where $\sigma_H$=the average of $\{\sigma_{k-1}, \sigma_{k-2}, \sigma_{k-N}\}$. The value N corresponds to some preselected number of previous points that provide a suitable average, such as 10. Then, the processor 36, in step 464, increments k to k+1 and sets the sampled point (X, Y) to the coordinates of the new point $(X_1, Y_1)$ and returns to step 460. As a result, steps 460, 462 and 464 are sequentially performed in several cycles as the processor 36 searches along an edge.

If the conditions of step 460 are not met, then the processor 36 proceeds to step 466. In step 466, the processor 36 samples and stores readings at all $(X_i, Y_i)$, where i=1, . . . M, and where each $I(X_i, Y_i)$ satisfies the condition:

$$1 \leq dist|(X_i, Y_i)(X_1, Y_1)| < (X\text{-dimension}/2)$$

and

-continued $$\left| \angle \overrightarrow{(X,Y)(X_1,Y_1)} - \sigma_H \right| < \pi/4, \text{ and}$$

stores them in its memory. The value M corresponds to a preselected, slightly larger neighborhood, such as 4, so that a 4×4 pixel neighborhood is examined (as opposed to the 3×3 neighborhood previously examined). As a result, the processor 36 detects and stores an intensity between 1 and less than one half an X-dimension distance that is not at a 45° or more angle from direction $\sigma_H$. Then, in step 468 the processor 36 compares all values $I(X_i, Y_i)$ with a threshold intensity value $I_{threshold}$, and if all the intensities $I(X_i, Y_i)$ are less than the $I_{threshold}$, then the processor 36 determines that a corner was reached and was not caused by an anomaly, but by a vertical reference bar 28. The coordinates of the located corner point are stored, and the subroutine 450 continues as the processor selects a new starting point (X, Y) beyond the previously selected point, and continues in the direction $\sigma_H$. The processor 36, knowing the version of the symbol 24, recognizes the number of root points that it must locate under the routine 450 before returning to the main program 200. After the processor 36 locates all of the corner points, the processor returns to the main program 200 in step 470 with the coordinates $(X_n, Y_n)$ of all of the upper root points $r_1(56)$ through $r_n(72)$ for the symbol 24.

If all the measured intensities $I(X_i, Y_i)$ are not less than the $I_{threshold}$, then the processor 36 proceeds to step 472. In step 472, the processor 36 compares all the measured intensities $I(X_i, Y_i)$ with the threshold intensity $I_{threshold}$, and if all the intensities $I(X_i, Y_i)$ exceed the threshold, then the processor 36 proceeds to step 474, returns to the main routine 200 and indicates on a display (not shown) that no corner was found. This display communicates to a user that the processor 36 is no longer taking samples along the bar it was traveling along, but is now sampling in a space or has left the recognition pattern 26. However, if at least some of the measured intensities $I(X_i, Y_i)$ are less than or equal to the threshold intensity $I_{threshold}$, then the processor 36 proceeds to step 476.

In step 476 the processor 36 jumps one-half an X-dimension, by changing the current X axis coordinate X to $X=X+\frac{1}{2}X_{dim} \cos \sigma_H$ and the current Y axis coordinate to $Y=Y+\frac{1}{2} X_{dim} \sin \sigma_H$, where $X_{dim}$ is the X-dimension. Thereafter, the processor 36 returns to step 456 and finds a new edge point. This allows the processor 36 to expand the scope of its search for the next edge point. The corner finding subroutine 450 continues until the processor 36 registers a success in finding the root point $r_1(56)$ or a failure is registered. As noted above, after determining the coordinates of the first root point $r_1(56)$, the routine selects a new starting point (X, Y) beyond the first point and in the direction $\sigma_H$ and the processor 36 repeats the subroutine 450 as described above until all of the root points through $r_n(72)$ are located, or a failure is registered. Finally, the processor 36 returns to the main routine 200.

Figure 18:
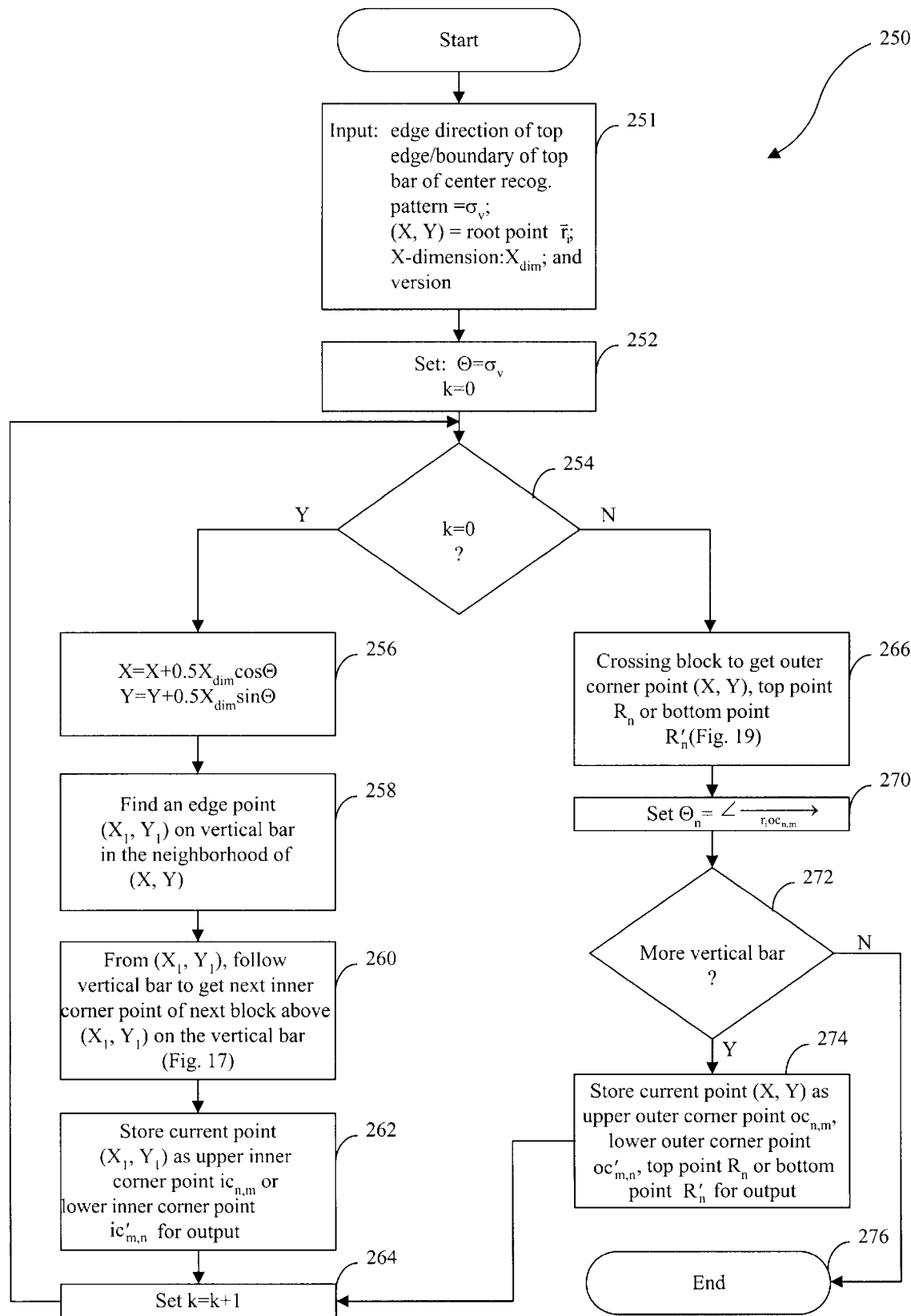
FIG. 18 is a flowchart of a subroutine for finding intersection points between all blocks on each vertical reference bar of the symbol of FIG. 15A.

After determining the root points $r_1(56)$ through $r_n(72)$, the processor 36 proceeds to step 203 in the main routine 200 in FIG. 16. In step 203, the processor 36 performs subroutine 250 and follows the length of each upper vertical reference bar 28, starting at the root points $r_1$ through $r_n$ to locate inner corner points $ic_{1,1}$ through $ic_{n,m}$ for each vertical bar i=1, . . . ,n, and for each block j=1, . . . ,m. Referring to FIG. 18, the processor 36 begins the subroutine 250 in step 251 by inputting the X-dimension, the version of the symbol 24, the direction of travel $\sigma_v$ along the vertical bar 28 (perpendicular to $\sigma_H$) and one of the root points $r_1(56)$ through $r_n(72)$. In step 252, the processor 36 sets a variable Θ to σ$_v$, and a variable k equal to zero. The variable Θ corresponds to an angle of direction of searching, while the variable k corresponds to the number of repetitions through the subroutine 206. In step 254, the processor 36 determines whether the variable k is equal to zero. If it is, then in step 256, the processor 36 increments the starting position (root point) by one-half of the X-dimension in the direction Θ under the following equation:

$$X = X + (0.5)(X_{dim})(\cos \Theta)$$

$$Y = Y + (0.5)(X_{dim})(\sin \Theta) \qquad (14)$$

In step 258, the processor 36 finds an edge point $(X_1, Y_1)$ on the vertical bar 28 in the neighborhood of the current point (X, Y). As noted above, "neighborhood" generally refers to a 3×3 pixel area surrounding the current point. In step 260, the processor 36 invokes the corner finding subroutine 450 of FIG. 17 to incrementally search along the edge of the vertical reference bar 28 to locate the inner corner point ic$_{1,1}$(63). The corner finding subroutine 450 operates as described above.

Once the processor 36, using subroutine 450, has determined the location of the inner corner point ic$_{1,1}$(63), the processor stores the location of the inner corner point in step 262, and in step 264 increments the value k by one and returns to step 254.

If the value k is greater than zero in step 254, then in step 266, the processor 36 performs a subroutine 500 for crossing through blocks 42 and locating outer corner points oc, such as outer corner point oc$_{1,1}$ shown in FIG. 15A.

Figure 19:
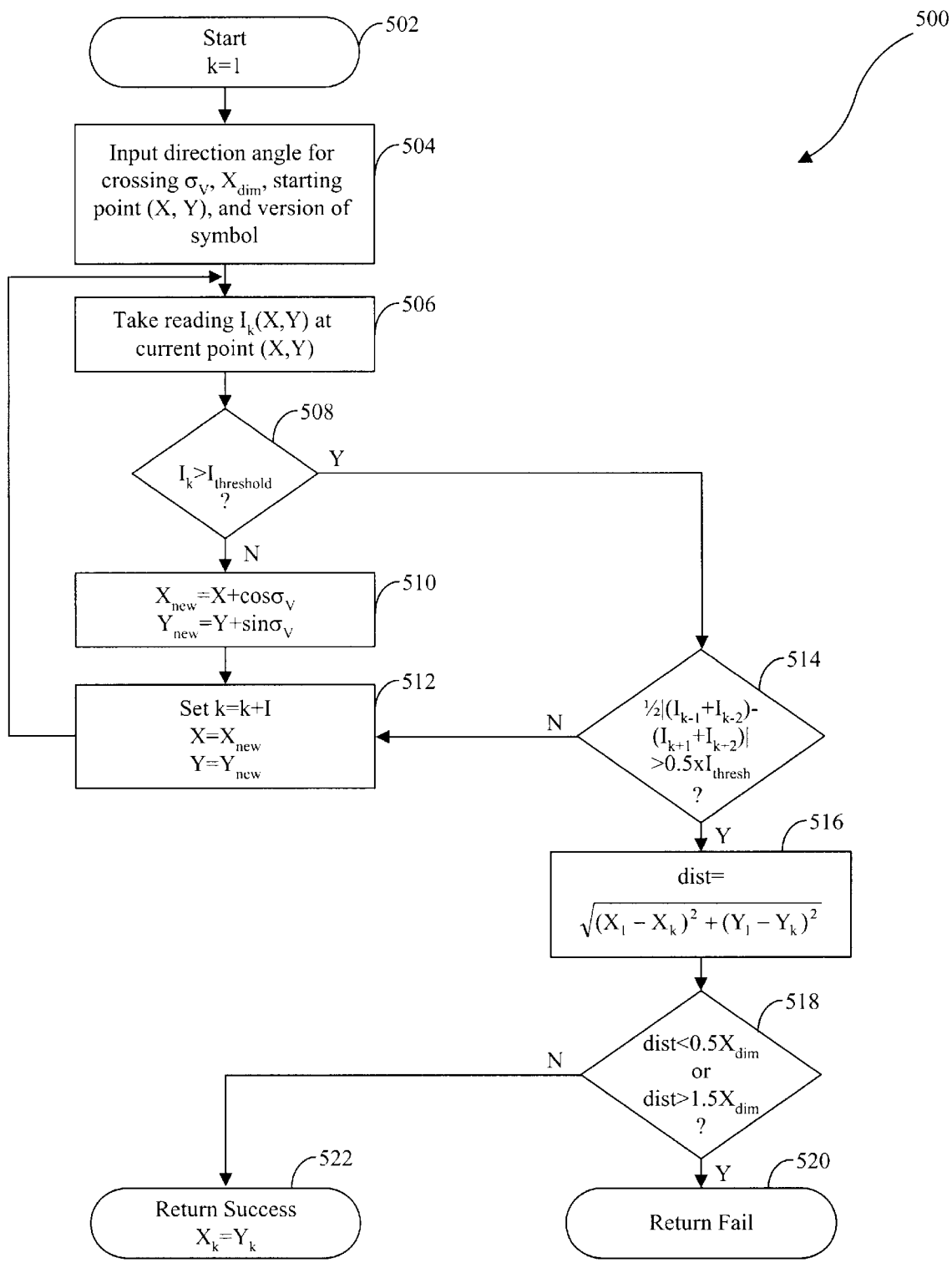
FIG. 19 is a flowchart of a subroutine for crossing blocks of each vertical reference bar of the symbol of FIG. 15A.

Referring to FIG. 19, in step 502 of the block or bar crossing subroutine 500, the processor 36 initializes a value k to one, where k represents the number of samplings. The processor 36 in step 504 recalls the direction for sampling σ$_H$ and the X-dimension of the symbol 24 from memory, as well as a starting point (X, Y), which for the first time is the inner corner point ic$_{1,1}$(63). Next, in step 506, the processor 36 takes and stores an intensity reading I$_k$(X, Y) at the current point (X, Y), and in step 508, the processor compares I$_k$(X, Y) with a threshold intensity value I$_{threshold}$. If the current intensity reading I$_k$(X, Y) does not exceed the threshold intensity, then the processor 36 determines that the block has not yet been crossed and proceeds to step 510.

In step 510 the processor 36 establishes a new point having new X- and Y-axis coordinates as X$_{new}$=X+cos σ$_v$ and Y$_{new}$=Y+sin σ$_v$. Then, in step 512, the processor 36 sets the value X=X$_{new}$, the value Y=Y$_{new}$, and increments k by one. The processor 36 loops back to step 506, moves to the new sampling point I$_k$(X, Y), and continues.

However, if in step 508 the processor 36 determines that the intensity reading I$_k$(X, Y) exceeds the threshold intensity, and that there is a possibility that the block has been crossed, then the processor proceeds to step 514. In step 514 the processor 36 checks intensity levels at two previously stored points and at two points following the current intensity I$_k$(X, Y), and compares these values to one half of the threshold intensity as follows:

$$\tfrac{1}{2}|(I_{k-1} + I_{k-2}) - (I_{k+1} + I_{k+2})| > 0.5 \cdot I_{threshold}. \qquad (15)$$

This extra step assists in determining if the bar has actually been crossed, or if some anomaly has been encountered. If the difference in intensities before and after the current point does not exceed one half of the threshold intensity, then the monitored point is merely an anomaly due to reflection, damage to the symbol 24, a printing error, etc. The processor 36 then calculates X$_{new}$ and Y$_{new}$ as well as increments the value of k in step 512, as described above, and returns to step 506 in the subroutine.

However, if the difference in intensities is greater than one half of the threshold intensity, then it is likely that the block 42 has been crossed. Thus, the processor 36 proceeds to step 516 to determine the distance of the point of crossing from the initially scanned point by using the distance formula:

$$dist = \sqrt{(X_1 - X_k)^2 + (Y_1 - Y_k)^2} \qquad (16)$$

Finally, the processor 36 proceeds to step 518, where it compares the calculated distance (dist) with the X-dimension of the symbol. If the distance is either less than 50% of the X-dimension or more than 150% of the X-dimension, then the processor 36 determines that the calculated size of the block 42 is too small or large to be correct, and it proceeds to step 520 where it returns to the main routine 200, and causes a display (not shown) to indicate that the attempt to locate the outer corner point has failed. If, however, the distance falls between 50% and 150% of the X-dimension, then the processor 36 proceeds to step 522 and returns to step 266 of the subroutine 206.

Referring back to FIG. 18, the processor 36 proceeds to step 270. In step 270 the processor 36 sets the angle Θ as the angle that the path between the root point $r_i$ (initially $r_1$(56)) and the outer corner point oc$_{n,m}$ (initially oc$_{1,1}$) makes with the Cartesian coordinate system, i.e., $$\Theta_n = \angle \overrightarrow{r_i o c_{n,m}}.$$

In step 272, the processor 36 determines whether any more of the vertical reference bar 28 is to be traversed. Since the processor 36 knows from step 250 the version of the symbol 24, it also knows the number of blocks to be traversed along each vertical reference bar 28. If there is more of the vertical reference bar 28 to be traversed, then in step 274, the processor 36 stores the outer corner point oc$_{i,j}$, which for the first iteration of the routine 206 is the outer corner point oc$_{1,1}$. The processor 36 proceeds to step 264, where it increments the value of k by one and loops back to step 254. The processor 36 repeats the routine 206 until all of the inner and outer corner points ic$_{i,j}$ and oc$_{i,j}$ are located and stored. At the end of each vertical reference bar 28, the processor 36 under the subroutine 206 crosses a last block or foot 43 and locates the top point R$_N$. After locating the positions of all of the outer and inner corner points and the top point for a first vertical reference bar 28, the processor 36 repeats the routine 206 for the next vertical reference bar until the inner, outer and top points for all of the vertical reference bars in the upper data region 60 are located. Thereafter, when the processor 36 in step 272 determines that there are no more vertical reference bars to traverse, the routine 206 proceeds to step 276 where the subroutine returns to the main routine 200.

Figure 20:
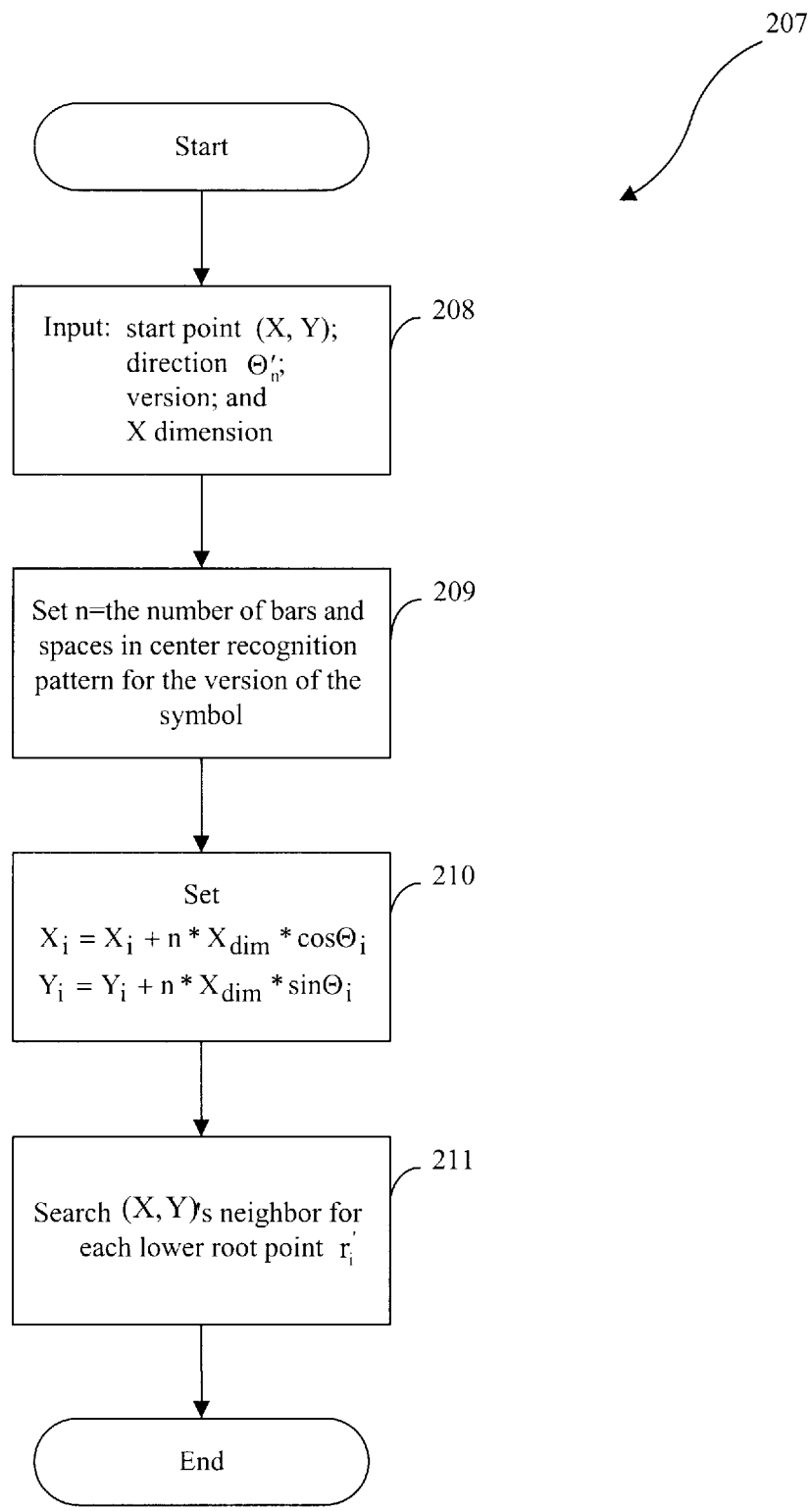
FIG. 20 is a flowchart of a subroutine for crossing the center recognition pattern and locating lower root points of the symbol of FIGS. 15A.

Referring back to FIG. 16, the processor 36 in step 207 starts at each of the root points $r_1$(56) through $r_n$(72) proceeds to travel along a direction 180° from Θ$_1$ and Θ$_N$ (or σ′$_v$) by a predetermined number of X-dimensions. Referring to FIG. 20, the processor 36 under subroutine 207 begins in step 208 by inputting the X- and Y-axis coordinates of starting points, which can be the upper root points $r_1$ through $r_N$. In step 208, the processor 36 also inputs the direction Θ′$_1$ through Θ′$_N$ which are 180° from the directions Θ$_1$ through Θ$_N$. In step 208, the processor 36 also inputs the version of the symbol 24 and its X-dimension. In step 209, the processor 36 sets a value n equal to the number of bars and spaces in the center recognition pattern 26 for the version of the symbol. For example, as shown in FIG. 12B, a version D Code One symbol has five bars and four spaces within its center recognition pattern.

In step 210, the processor 36 sets X and Y coordinates of points $X_i$ and $Y_i$ for each lower vertical reference bar 28' 1 . . . , n based on the following equation:

$$X_i = X_i + (n)(X_{dim})(\cos \Theta_i)$$

$$Y_i = Y_i + (n)(X_{dim})(\sin \Theta_i) \qquad (17)$$

In step 211, the processor 36 then searches in a neighborhood surrounding each point $(X_i, Y_i)$, to find each lower root point $r'_1$ through $r'_N$. For example, the processor 36 in step 211 examines a 3 pixel by 3 pixel area surrounding each point $(X_i, Y_i)$ for each i=1, . . . , n, to locate the root points under a corner finding routine as described above to FIG. 17. Thereafter, the processor 36 returns to the main routine 200 (FIG. 16).

In step 212, the processor 36 follows an edge of the lower vertical reference patterns 28', from the lower root points $r'_1(80)$ through $r'_n(82)$, to locate the positions of lower inner corner points $ic'_{1,1}$ through $ic'_{m,n}$ lower outer corner points $oc'_{1,1}$ and $oc'_{m,n}$, and bottom points $R'_1$ through $R'_N$, all respectively, by invoking the corner finding subroutine 450 (FIG. 18) discussed above. By essentially performing the same steps described above, the processor 36 under the subroutine 250 locates and stores the positions of lower, inner and outer corner points, and bottom points $R'_1$ through $R'_N$. After locating all such points within the lower data region 70, the processor 36 returns to the main routine 200 of FIG. 16.

Figure 21:
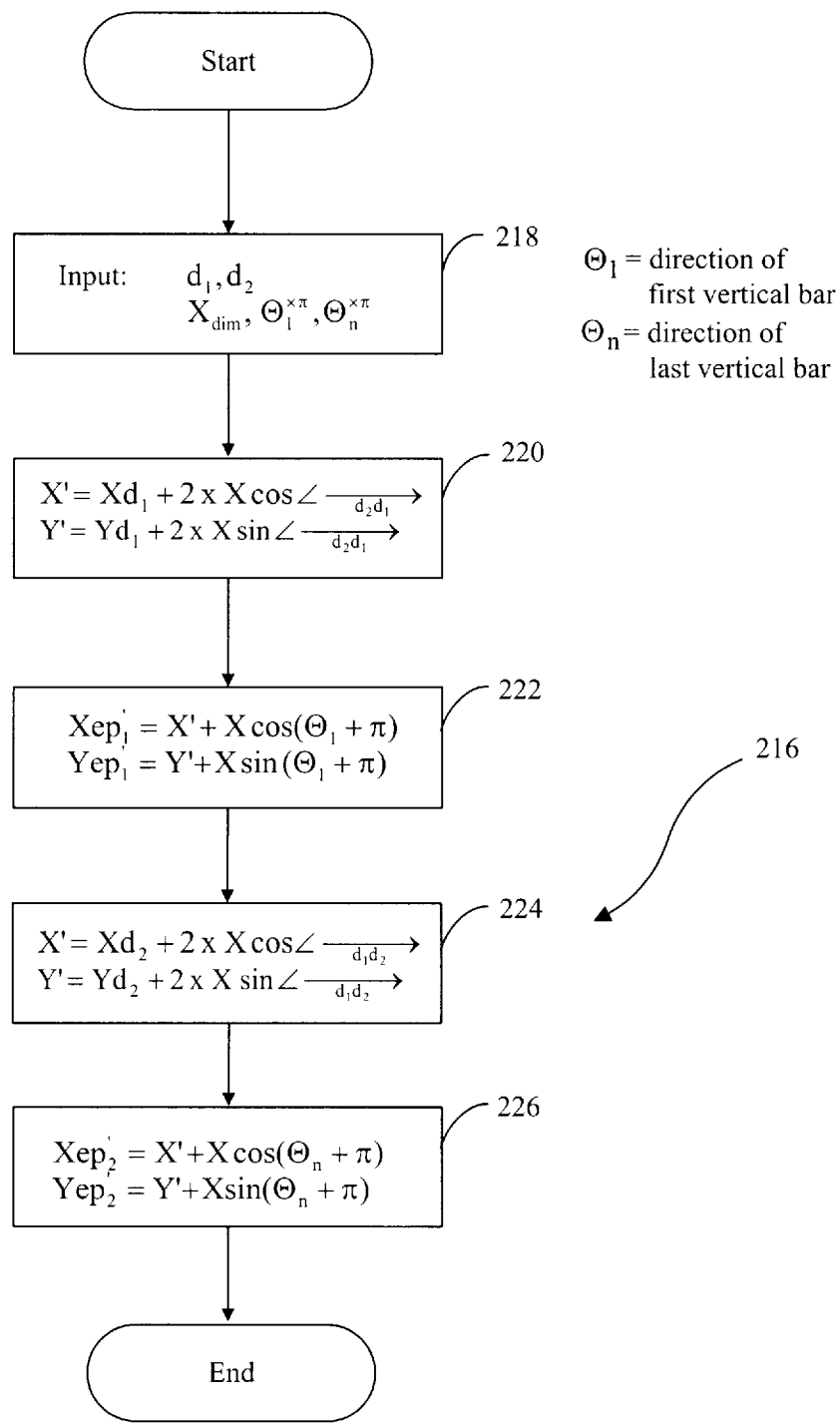
FIG. 21 is a flowchart of a subroutine for computing the end points $ep'_1$ and $ep'_2$ for a lower edge of the center recognition pattern of the symbol of FIG. 15A.

In step 216, the processor 36 locates the positions of lower end points $ep'_1(106)$ and $ep'_2(104)$, which correspond to end points of the lower bar 107 if it were extended outward to a length equal to that of the top long bar 50. Referring to FIG. 21, the subroutine 216 begins in step 218 by inputting the positions of inner corner points $d_1$ and $d_2$ of the center recognition pattern 26 (FIG. 15A). The inner corner points $d_1$ and $d_2$ can be input by a user or located by known means. In step 218, the processor 36 also inputs the $X_{dim}$ and directions 180° from the angle $\Theta_1$ for the first vertical reference bar 28, and the angle $\Theta_N$ for the last vertical reference bar 28 in the upper data region 60. In step 220, the processor 36 establishes X and Y axis positions for an initial end point under the following equation:

$$X' = X_{d1} + (2)(X_{dim})(\cos \angle \overrightarrow{d_2 d_1})$$

$$Y' = Y_{d1} + (2)(X_{dim})(\sin \angle \overrightarrow{d_2 d_1}) \qquad (18)$$

In step 222, the processor 36 establishes the X and Y axis coordinates of the lower end point $ep'_1$ based on the following equation:

$$Xep'_1 = X' + (X_{dim})(\cos (\Theta_1 + \pi))$$

$$Yep'_1 = Y' + (X_{dim})(\sin (\Theta_1 + \pi)) \qquad (19)$$

In step 224, the processor 36 establishes the positions of points X' and Y' for the second lower end point $ep'_2$ based on the following equation:

$$X' = X_{d1} + (2)(X_{dim})(\cos \angle \overrightarrow{d_1 d_2})$$

$$Y' = Y_{d1} + (2)(X_{dim})(\sin \angle \overrightarrow{d_1 d_2}) \qquad (20)$$

Thereafter, in step 226, the processor 36 establishes the X and Y axis coordinates of the second lower end point $ep'_2$ based on the following equation:

$$Xep'_2 = X' + (X_{dim})(\cos (\Theta_n + \pi))$$

$$Yep'_2 = Y' + (X_{dim})(\sin (\Theta_n + \pi)) \qquad (21)$$

In steps 222 and 226, the processor 36 also stores the X and Y axis positions of the lower end points $ep'_1$ and $ep'_2$. Following step 226, the processor 36 returns to the main routine 200.

Referring back to FIG. 16, in subroutine 280, the processor 36 examines the outer corner points $oc_{i,j}$ and $oc'_{i,j}$ for each layer, i.e., where j is equal to a specific value between 1 and m. In other words, the processor 36 in subroutine 280 examines the outer corner points for a given series of upper blocks 42 or lower blocks 42', such as the first series of upper blocks 42 along each of the upper vertical reference patterns 28. With each outer corner point for a given layer j, the processor 36 employs linear fitting techniques to establish a line between collinear outer corner points for each layer. Similarly, the processor 36 in subroutine 280 employs linear fitting techniques for collinear top points $R_1$ through $R_N$ and bottom points $R'_1$ and $RN'_N$.

Figure 22:
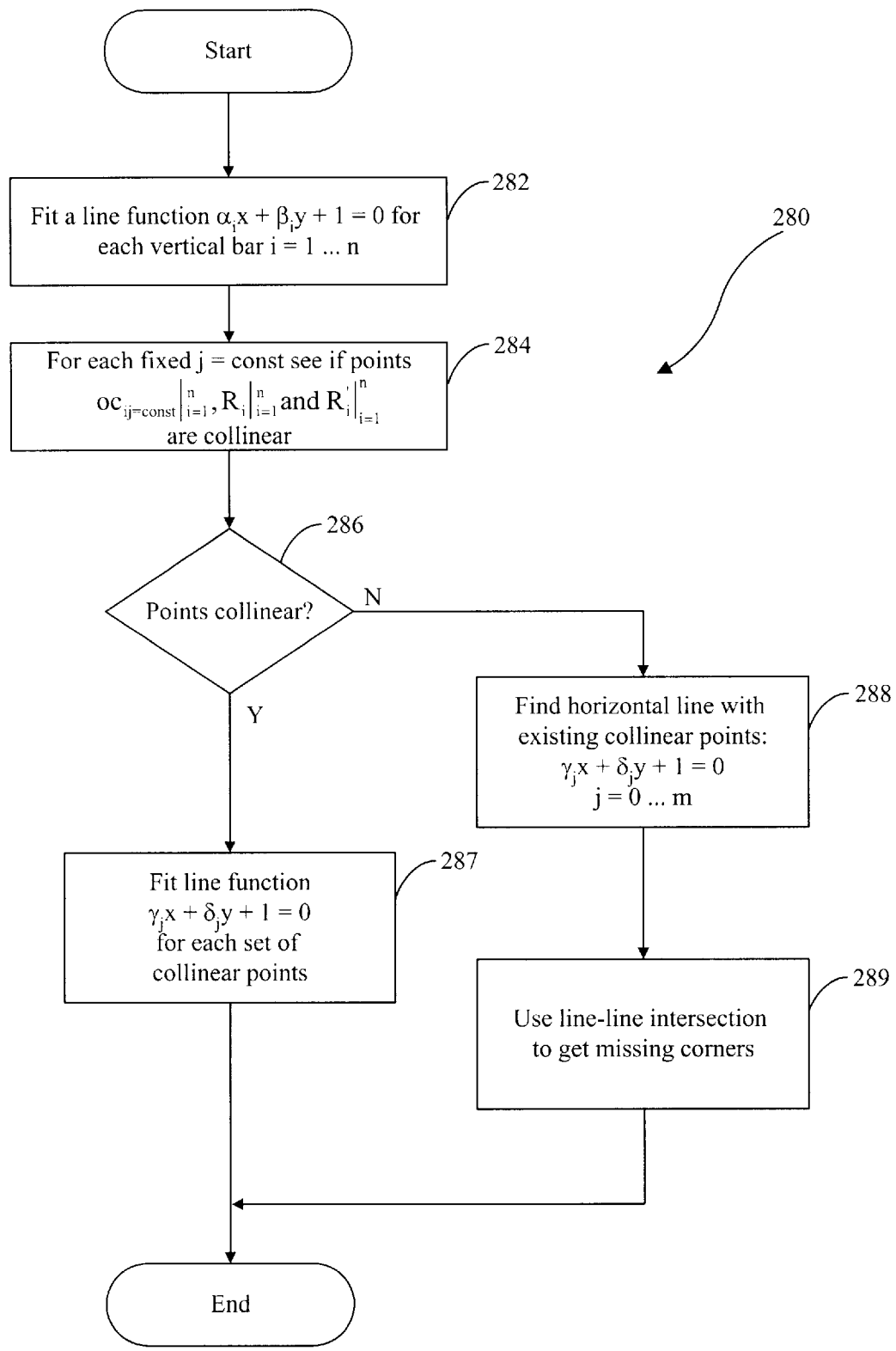
FIG. 22 is a flowchart of a subroutine for defining lines for bounding boxes for the symbol of FIG. 15A.

Referring to FIG. 22, the processor 36 begins subroutine 280 in step 282 where the processor employs known linear fitting routines to fit the following line function:

$$\alpha_i x + \beta_i y + 1 = 0 \qquad (22)$$

for each upper and lower vertical reference bars 28 and 28' from i=1, . . . , n. In step 282, the processor 36 establishes vertical lines within the upper and lower data regions 60 and 70 that will ultimately become sides of several bounding boxes.

In step 284, the processor 36 examines sets of outer corner points $oc_{i,j}$, top points $R_1$ through $R_N$ and bottom points $R'_1$ through $R'_N$ to determine if they are collinear, for a given layer (i.e., where j is equal to a constant between 1 and m). In step 286, if the processor determines that the points in a given layer are collinear, then in step 287, the processor fits a line function as follows:

$$\gamma_j x + \delta_j y + 1 = 0 \qquad (23)$$

for each layer of collinear points for a given layer (j=1, . . . , m).

If the points of one or more layers are not collinear in step 286, then in step 288 the processor 36 finds horizontal lines functions under equation (23) with all existing collinear points, and ignores those points in a given layer which are not collinear. Then, in step 289, the processor 36 employs line-to-line intersection in a "connect the dots" fashion to establish an accurate line function through areas in the upper or lower data regions 60 or 70 that produced inaccurate, non-collinear points. Under steps 288 and 289, and in step 287, the processor 36 establishes line functions for vertical lines in the upper and lower regions 60 and 70 that complete all of the bounding boxes between upper and lower vertical reference bars 28 and 28'. Under either step 287 or steps 288 and 289, the processor 36 establishes horizontal line functions for each layer in the symbol 24. Following steps 287 and 289, the processor 36 returns to the main routine 200.

Referring back to FIG. 16, the processor 36 in step 290 extends the top points $R_1$ through $R_N$ to establish top corner points $cp_1$(100) and $cp_2$(102), and extends bottom points $R'_1$ and $R_N$ to establish lower corner points $cp_1$(108) and $cp'_2$ (110), under a subroutine 350.

Figure 23:
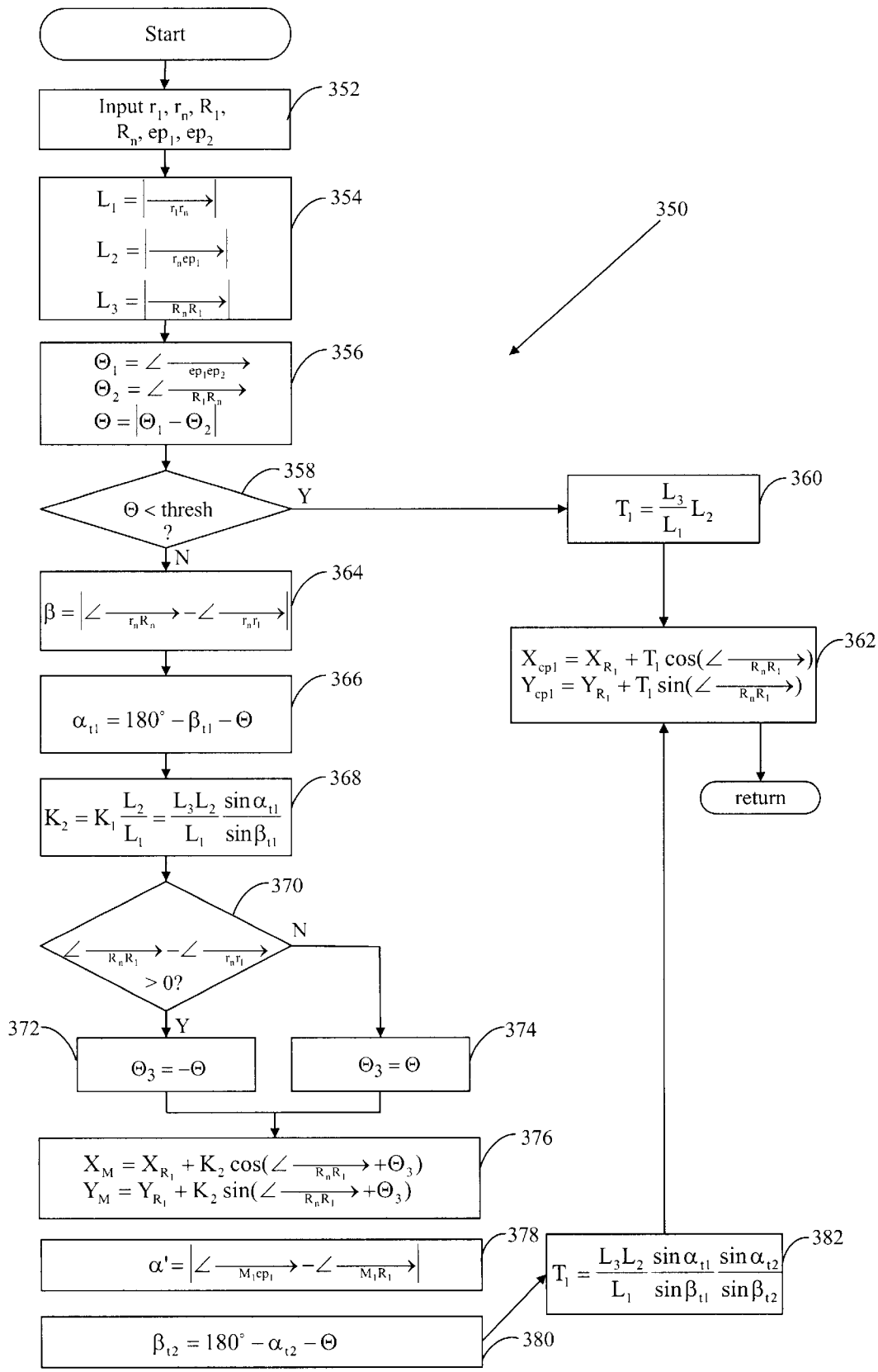
FIG. 23 is a flowchart of a subroutine to determine corner points of the symbol of FIG. 15, such as a corner point $cp_1$.

Referring to FIG. 23, the processor 36 under the corner point locating subroutine 350 begins in step 352 by recalling and inputting the previously calculated locations or values $r_1$(56), $r_n$(72), $R_1$(68), $R_n$(78), $ep_1$(52), and $ep_2$(54). Then, in step 354, the processor 36 determines a length $L_1$, as shown in FIG. 15B, by measuring the distance between the root points $r_1$(56) and $r_n$(72). In step 354 the processor 36 also determines a length $L_2$ by measuring the distance between the root point $r_1$(56) and the end point $ep_1$(52). Further, the processor 36 determines a length $L_3$, also shown in FIG. 15B, by measuring the distance between the top points $R_n$(78) and $R_1$(68). The lengths $L_1$, $L_2$, and $L_3$ are determined by using the well-known distance formula recited above. The processor 36 then stores these lengths in its memory, and proceeds to step 356.

In step 356, the processor 36 calculates the angle $\Theta$, which is essentially a distortion of angular difference between a line connecting the end points of the top long bar 50 of the symbol 24 and the line connecting the top points $R_1$ and $R_n$ of the symbol. In a non-distorted symbol these lines would be parallel, but any existing angular difference between the lines should be compensated. Initially, in step 356, the processor 36 determines the angle $\Theta_1$, i.e., an angle between a line connecting the end points $ep_1$(52) and $ep_2$(54) and the X-axis of the Cartesian coordinate system of the image retrieval system. Then, the processor 36 determines the angle $\Theta_2$, i.e., an angle between a line connecting top points $R_1$(68) and $R_n$(78) and the X-axis of the Cartesian coordinate system. Finally, the processor 36 subtracts $\Theta_1$ from $\Theta_2$ to determine the angular difference $\Theta$, i.e., $\Theta = |\Theta_1 - \Theta_2|$. The values of $\Theta_1$, $\Theta_2$ and $\Theta$ are then stored in the memory of the processor 36.

In step 358, the processor 36 compares the angular difference $\Theta$ with some predetermined threshold angular value. The threshold angular value is some angle that will allow a simplified calculation to approximate a corner point if it is not exceeded. If the processor 36 finds that the angular difference $\Theta$ is less than the threshold value, then it proceeds to step 360, where, using a "short cut" method, the processor 36 determines a length $T_1$, which is the distance between top point $R_1$(68) and first corner point $cp_1$(100). The value of $T_1$ is approximated by a calculation $$T_1 = \frac{L_3}{L_1} \cdot L_2.$$

Then, in step 362, the processor 36 uses the value $T_1$ to determine the X-axis coordinate of the corner point $cp_1$(100) using the following equation:

$$Xcp_1 = X_{R1} + T_1\cos(\angle \overrightarrow{R_nR_1}).  \tag{24}$$

The Y-axis coordinate of the corner point $cp_1$(100) is also determined in step 362 using the following equation:

$$Ycp_1 = Y_{R1} + T_1\sin(\angle \overrightarrow{R_nR_1}).  \tag{25}$$

The processor 36 then returns to the main routine 200, as shown in FIG. 16.

If, however, in step 358, the processor 36 determines that the angular difference $\Theta$ is not less than the predetermined threshold angular value, then the processor 36 proceeds to step 364. In step 364, the processor 36 determines an angle $\beta_{t1}$ between the line connecting the root point $r_n$(72) and the top point $R_n$(78) and a line 116 exactly parallel to the line connecting the root point $r_n$(72) and the root point $r_1$(56) as calculated in the following equation:

$$\beta_{t1} = |\angle \overrightarrow{r_nR_n} - \angle \overrightarrow{r_nr_1}|.  \tag{26}$$

Then, in step 366 the processor 36 calculates an angle $\alpha_{t1}$, which is the angle between the line connecting the root point $r_n$(72) and the top point $R_n$(78) and the line connecting the top points $R_n$(78) and $R_1$(68), using the following equation:

$$\alpha_{t1} = 180° - \beta_{t1} - \Theta.  \tag{27}$$

In step 368, the processor 36 calculates a length $K_2$ from top point $R_1$(68) to a point $M_1$(118), which is where the corner point $cp_1$ would be if there were no distortion of the symbol 24. A length $K_2$, equals the distance between the point $R_1$ and a point $R_{nt}$ as shown in FIG. 15B. To determine the value of $K_2$, the processor 36 uses the following equation:

$$K_2 = K_1\frac{L_2}{L_1} = \frac{L_3L_2}{L_1} \cdot \frac{\sin\alpha_{t1}}{\sin\beta_{t1}}  \tag{28}$$

In step 370, the processors 36 checks to see if the angular difference between the line connecting the top points $R_n$(78) and $R_1$(68) and the line connecting root points $r_n$(72) and $r_1$(56) is greater than zero. If it is, then the processor 36 sets a value $\Theta_3$ equal to $-\Theta$ in step 372; however, if the processor 36 determines that the angular difference is not greater than zero, then the processor 36 sets the value $\Theta_3$ equal to $\Theta$ by branching to step 374 instead. Next, in step 376, the processor 36 calculates the coordinates of the point $M_1$(118) shown in FIG. 15B.

The X position of the point $M_1$(118) along the X axis on the Cartesian coordinate system is calculated by the processor 36 using the following equation:

$$X_{M1} = X_{R1} + K_2\cos(\angle \overrightarrow{R_nR_1} + \Theta_3).  \tag{29}$$

The Y position of the point $M_1$(118) on the Y axis of the Cartesian coordinate system is calculated by the processor 36 using the following equation:

$$Y_{M1} = X_R + K_2\sin(\angle \overrightarrow{R_nR_1} + \Theta_3).  \tag{30}$$

The processor 36 next determines the inner angles of a triangle 120, shown in FIG. 15B, to assist in calculating the value $T_1$, discussed above. First, the processor 36 calculates a value $\alpha_{t2}$ using the following equation:

$$\alpha_{t2} = |\angle \overrightarrow{M_1ep_1} - \angle \overrightarrow{M_1R_1}|,  \tag{31}$$

where the angle $\alpha_{t2}$ is the difference between the angles of the line connecting the point $M_1$(118) and the end point $ep_1$(52) and the line connecting the point $M_1$(118) and the top point $R_1$(68) as shown in FIG. 5B. Next, the processor 36 in step 380 calculates an angle $\beta_{t2}$ using the equation:

$$\beta_{t2} = 180° - \alpha_{t2} - \Theta.  \tag{32}$$

After the angles $\alpha_{t2}$ and $\beta_{t2}$ have been calculated, the value of $T_1$, which is the line connecting the top point $R_1$(68)

with the first corner point $cp_1(100)$, is approximated by the processor 36 in step 382 using equation (10) reprinted below:

$$T_1 = \frac{L_3 \cdot L_2}{L_1} \cdot \frac{\sin\alpha_{t1}}{\sin\beta_{t1}} \cdot \frac{\sin\alpha_{t2}}{\sin\beta_{t2}} \qquad (10)$$

Once the value of $T_1$ has been calculated, the processor 36 proceeds to step 362, discussed above, and calculates the X- and Y-axis coordinates of the first corner point $cp_1(100)$ under equations (24) and (25). After the first corner point $cp_1(100)$ has been located, the processor 36 returns to main routine 200.

In step 270 (FIG. 16), the processor 36 determines whether additional outermost corner points must be determined. If so, then the steps of the subroutine 350 are repeated for each corner point until the corner points $cp_2(102)$, $cp'_1(108)$ and $cp'_2(110)$ are located. While the steps of the subroutine 350 are explained above by way of example for determining the upper right corner point $cp_1(100)$, those skilled in the art can readily adapt the steps of the subroutine to locate the remaining corner points $cp_2(102)$, $cp'_1(108)$ and $cp'_2(110)$ based on the detailed description provided herein. Additional description of the steps of the subroutine 350, and how it is readily applied to determining other corner points, can be found in the inventor's U.S. patent application Ser. No. 08/571,257, entitled "METHOD AND APPARATUS FOR LOCATING DATA REGIONS IN STORED IMAGES OF SYMBOLS, FILED DEC. 11, 1995," incorporated herein by reference.

For example, referring to FIG. 15C, the processor 36 performs the steps of the subroutine 350 (FIG. 23) to locate the position of the upper left corner point $cp_2(102)$. The processor 36 determines an angle $\beta_{T3}$ which is the angle between a line connecting the root point $R_1(56)$ with the top point $R_1(68)$ and a line 122 that is parallel to the line connecting the end points $ep_2(74)$ and $ep_1(52)$. Likewise, the processor 36 under the routine 350 determines an angle $\alpha_{T3}$, an angle between a line connecting the top point $R_N(78)$ and the top point $R_1(68)$ and the line connecting the top point $R_1(68)$ and the root point $r_1(56)$, and angles $\alpha_{T4}$, $\beta_{T4}$ and $\Theta_{T2}$ within a triangle 124 defined by top point $R_N(78)$, corner point $cp_2(102)$ and an undistorted corner point $M_2(126)$, all as shown in FIG. 15C.

The processor 36 under the routine 350 likewise determines the lower corner points $cp'_1(108)$ and $cp'_2(110)$. Thereafter, in step 270 (FIG. 16), the processor 36 computes equations for lines connecting each corner point $cp_1(100)$, $cp_2(102)$, $cp'_1(108)$ and $cp'_2(110)$ to its adjacent end point and top/bottom point. For example, the processor 36 computes the equations of lines connecting the top left corner point $cp_1(100)$ with the top point $R_1(68)$ and the equation of the line connecting that corner point with the end point $ep_1(52)$. The equations of horizontal lines computed in step 260 are extended out to intersect the outer vertical lines connecting the corner points $cp_1$, $cp_2$, $cp'_1$ and $cp'_2$ with end points $ep_1$, $ep_2$, $ep'_1$ and $ep'_2$, respectively. Alternatively, in step 270, the processor 36 can perform the steps of subroutine 350, or just the steps 352 through 362, for each set of outer corner points $oc_{i,j}$ for each layer (i.e., j equal to a constant from 1 to M). Such an alternative, particularly if the entire routine 350 were performed for each layer of outer corner points, provides an extremely accurate method of determining the bounding boxes for data regions between the upper and lower vertical reference bars 28 and 28' and a quiet zone surrounding the symbol 24.

All recoverable information in the data cells of the symbol 24 lie within the multiple upper and lower bounding boxes 38 and 38' determined under the above steps. After determining the locations of such boxes, the processor 36 further subdivides each bounding box 38 and 38' by defining regular points along the sides of the boxes, which are spaced apart by a distance approximately equal to the X-dimension. Horizontal and vertical lines are then drawn connecting opposite points along the sides of each box (such as shown in FIG. 7). At the intersection of each pair of lines, a data cell exists. After defining the locations of all data cells within the symbol 24, the processor 36 can decode the retrieved data from the data cells in the symbol. Once all the above-mentioned bounding box data have been retrieved, stored, and decoded, the main routine ends, until a new image of a symbology is stored, or the processor independently requests a recalculation of the dimensions of the bounding boxes.

Thus, the present invention allows the accurate determination of bounding boxes by defining several boxes in the upper and lower data regions 60 and 70 and minimizing any inherent error in the calculation of its boundaries. This error minimization is accomplished by utilizing the vertical reference bars and long bars when calculating the corner points of the bounding boxes.

While the detailed description above has been expressed in terms of specific examples, those skilled in the art will appreciate that many other configurations could be used to accomplish the purpose of the disclosed inventive apparatus. For example, a method similar to that described above can be used to define bounding boxes of version A and B of symbols that have only one vertical reference bar in each of a lower and upper bounding box.

Additionally, while landmark "points" are generally located herein, the present invention can also locate the positions of areas or "portions" of the symbol 24, such as inner and outer corner portions of blocks 42 and 42'. Accordingly, it would be appreciated that the various equivalent modifications of the above-described embodiments may be made without departing from the spirit and scope of the invention. Therefore, the invention is to be limited only by the following claims.

I claim:

1. A method for computing a location of data regions in a stored image of a symbol, the symbol including a plurality of symbol characters and a recognition pattern having an outermost bar and at least one vertical reference pattern extending perpendicularly from the recognition pattern, the method comprising the steps of:

locating a position of a first end portion and a second end portion of the outermost bar of the recognition pattern in the stored image, wherein the stored image may include distortions of the symbol;

locating a position of a root portion at an intersection between the at least one vertical reference pattern and the outermost bar in the stored image;

locating a position of an outermost portion at a free end of each of the at least one vertical reference pattern in the stored image;

determining a position of a first corner portion and a second corner portion for the symbol in the stored image by extending at least one line from the outermost portion of each at least one vertical reference pattern a predetermined distance in a predetermined direction; and defining at least first and second areas enclosing at least some of the plurality of symbol characters in the data regions of the symbol, the first area being defined by the positions of the first end portion, the first corner portion, the root portion, and the outermost portion, and the second area being defined by the second end portion, the second corner portion, the root portion, and the outermost portion.

2. The method for computing a location according to claim 1 wherein the at least one vertical reference pattern has a foot at the free end and at least one block extending transversely therefrom, and wherein the step of locating the position of the outermost portion includes the steps of:

traveling along each of the at least one vertical reference pattern until an inner corner portion of the at least one block of the at least one vertical reference pattern is reached;

crossing the at least one block of the at least one vertical reference pattern to determine a location of an outer corner portion;

traveling along each of the at least one vertical reference pattern until an inner corner portion of the foot of the at least one vertical reference pattern is reached;

crossing the foot of the at least one vertical reference pattern to determine the location of the outermost portion; and wherein the step of defining at least first and second areas defines first and second bounding boxes in the first area and third and fourth bounding boxes within the second area, the first bounding box being defined by at least the first end portion, the root portion, and the outer corner portion, and the second bounding box being defined by at least the outer corner portion, the outermost portion, and the first corner portion, the third bounding box being defined by at least the second end portion, the root portion, and the outer corner portion, and the fourth bounding box being defined by the outer corner portion, the outermost portion, and the second corner portion.

3. The method for computing a location according to claim 1 wherein the step of locating the position of the outermost portion includes the steps of:

traveling along each of the at least one vertical reference pattern until an inner corner of a foot of the at least one vertical reference pattern is reached; and crossing the foot of the at least one vertical reference pattern to determine the location of the outermost portion.

4. The method for computing a location according to claim 3 wherein the step of locating a position of the root portion includes the steps of:

starting at one of the first end portion and the second end portion and incrementally advancing along the edge of the outermost bar from the one of the first and second end portion until an edge is no longer detected ahead of the advance and a direction of the edge changes by approximately 90°; and designating a termination of the advance along the outermost bar as the root portion of the at least one vertical reference pattern.

5. The method for computing a location according to claim 3 wherein the step of traveling along each of the at least one vertical reference pattern includes the steps of:

starting at one of the root portion of the at least one vertical reference pattern and incrementally advancing along the at least one vertical reference pattern until at least one of an edge is no longer detected ahead of the advance and a direction of the edge alters by more than approximately 90°; and designating a termination of the advance along the at least one vertical reference pattern as the inner corner of the foot of the at least one vertical reference pattern.

6. The method for computing a location according to claim 3 wherein the step of crossing the foot of the at least one vertical reference pattern includes the steps of:

taking a reading of an intensity at a present position;

comparing the intensity against a threshold intensity;

incrementally advancing the position along a crossing direction until an intensity at a current portion exceeds the threshold intensity; and designating the current portion where the threshold intensity was exceeded as the outermost portion.

7. The method for computing a location according to claim 5 wherein the crossing direction is perpendicular to an entry boundary on the foot.

8. The method of computing a location according to claim 1 wherein the step of locating a position of the root portion includes the step of locating a plurality of root portions at an intersection between a plurality of vertical reference patterns and the outermost bar;

wherein the step of locating a position of the outermost portion locates a plurality of outermost portions at free ends of the plurality of vertical reference patterns and a plurality of corner points at an intersection between the plurality of vertical reference patterns and at least one block extending transversely from each vertical reference pattern; and wherein the step of defining at least first and second areas includes the step of determining a plurality of vertical and horizontal linear functions wherein each vertical linear function includes the root portion and the outermost portion for one of the plurality of vertical reference patterns, wherein each horizontal linear function includes either the plurality of outermost portions or the plurality of corner portions, and wherein a plurality of areas enclosing the data regions are defined by an intersection of the plurality of horizontal and vertical linear functions.

9. The method of computing a location according to claim 8 wherein the step of determining a plurality of vertical and horizontal linear functions includes the step of determining if the plurality of outermost portions are collinear and whether the plurality of corner portions are collinear, and ignoring one or more of the outermost portions that are not collinear with remaining outermost portions, and ignoring one or more corner portions that are non-collinear with remaining corner portions.

10. The method for computing a location according to claim 1 wherein the step of determining a position of the first and second corner portions includes the steps of:

determining positions of first and second root portions respectively located at intersections between first and second vertical reference patterns and the outermost bar of the recognition pattern; and calculating the predetermined distance based on a ratio defined by a distance between the first and second outermost portions of the first and second vertical reference patterns multiplied by a distance between one of the first and second root portions and one of the first and second end portions of the outermost bar divided by a distance between the first and second root portions.

11. The method for computing a location according to claim 1, further comprising the step of:

comparing an angle of a line connecting the first end point and the second end point with a line connecting first and second outermost points of first and second vertical reference bars, respectively, to determine a correction value; and wherein the step of calculating the predetermined distance includes multiplying the ratio by the correction value.

12. A method for computing bounding boxes of a Code One symbol in a stored image of the symbol having a recognition pattern, including a top bar adjacent an upper data region and a lower bar adjacent a lower data region, and at least four vertical reference bars, each having a foot end away from the recognition pattern, a root portion and a block positioned therebetween, the four vertical reference bars including first and second vertical reference bars whose root portion is contiguous with the top bar, and third and fourth vertical reference bars whose root portion is contiguous with the lower bar, wherein the upper and lower data regions contain a plurality of symbol characters, the method comprising the steps of:

locating a position of a first end point and a second end point of the top bar in the stored image, wherein the stored image may include distortions of the symbol;

locating a position of root points at the root portions of the first and second vertical reference bars from at least one of the first and second end points in the stored image;

locating in the stored image an inner corner point of each of the block portions of the first and second vertical reference bars from the root points of the first and second vertical reference bars, respectively;

crossing the block portions of the first and second vertical reference bars to locate outer corner points of each of the blocks of the first and second vertical reference bars;

locating in the stored image inner corner points of the foot of the first and second vertical reference bars from the outer corner points of the first and second vertical reference bars, respectively;

crossing the foot of the first and second vertical reference bars to reach a top point of the first and second vertical reference bars;

projecting from the root points of the first and second vertical reference bars in a second predetermined direction along the recognition pattern;

determining the location of root points of the root portion of the third and fourth vertical reference bars in the stored image;

locating in the stored image an inner corner point of each of the block portions of the third and fourth vertical reference bars from the root points of the third and fourth vertical reference bars, respectively;

crossing the block portions of the third and fourth vertical reference bars to locate outer corner points of each of the blocks of the third and fourth vertical reference bars;

locating in the stored image the inner corner points of the foot of the third and fourth vertical reference bars from the outer corner points of the third and fourth vertical reference bars, respectively;

crossing the foot of the third and fourth vertical reference bars to reach bottom points of the third and fourth vertical reference bars;

determining a plurality of vertical line functions for each of the first, second, third and fourth vertical reference bars, based on the root points and top or bottom points of each vertical reference bar;

determining a plurality of horizontal linear functions, each linear function based on the top points, bottom points, corner points of the first and second vertical reference bars, and corner points of the third and fourth vertical reference bars; and defining a plurality of upper and a plurality of lower bounding boxes based on intersections of the plurality of vertical line and horizontal linear functions, the plurality of bounding boxes enclosing the upper and lower data regions of the Code One symbol.

13. The method for computing according to claim 12 wherein the step of locating a position of the root points of the first and second vertical reference bars includes the steps of:

moving along the top bar in incremental steps from one of the first and second end points;

continuing to advance along the top bar until at least one of an edge is no longer detected ahead of the advance and a direction of the edge changes by approximately 90°; and designating a termination of the advance along the top bar as the root portion of the first and second vertical reference bars.

14. The method for computing according to claim 13 wherein the step of locating an inner corner point of the blocks of the first and second vertical reference bars, comprises the steps of:

starting at the root portion of the first and second vertical reference bars;

proceeding to incrementally advance along the at least one vertical reference pattern until at least one of an edge is no longer detected ahead of the advance and a direction of the edge alters by approximately more than 90°; and designating a termination of the advance along the first and second vertical reference patterns as the inner corner point of the blocks of the first and second vertical reference patterns.

15. The method for computing according to claim 13 wherein the steps of crossing the block portions and crossing the foot of the first and second vertical reference bars comprises the steps of:

taking a reading of an intensity at a preset position;

comparing the intensity against a threshold intensity;

incrementally advancing the position along a crossing direction until the intensity at that point exceeds the threshold intensity; and designating the position where the threshold intensity was exceeded as one of the outer corner point and the top point of the first and second vertical reference bars.

16. An apparatus for decoding a machine-readable symbol representing encoded information, the symbol having a recognition pattern with an outermost bar and at least one vertical reference pattern extending approximately perpendicular from the recognition pattern, the apparatus comprising:

a sensor that receives light reflected from the symbol and produces an output signal therefrom;

a receiver that receives the output signal and produces a data signal indicative of the encoded information, the recognition pattern and the at least one vertical reference pattern, wherein the data signal may represent distortions of the symbol; and a processor for decoding the encoded information encoded in the symbol, the processor being programmed to (a) locate a position of a first end point and a second end point of the outermost bar of the recognition pattern from the data signal, (b) locate a position of each of the vertical reference patterns and an outermost point of each of the at least one vertical reference patterns from the data signal, (c) determine a position of a first corner point and a second corner point for the symbol by calculating at least one line from the outermost points a predetermined distance in a predetermined direction, (d) define a plurality of bounding boxes using the positions of the first end point, the second end point, the first corner point, the second corner point, the outermost points and the positions of the at least one vertical reference patterns, and (e) decode the encoded information within the plurality of bounding boxes.

17. The apparatus of claim 16 wherein the processor is programmed to locate the position of the outermost point by (i) examining the outermost bar from at least one of the first end point toward the second end point until a root point at an adjacent base of the vertical reference pattern is located, (ii) traveling along each of the at least one vertical reference pattern until an inner corner of a foot of the at least one vertical reference pattern is located, and (iii) examining the foot of the at least one vertical reference pattern to determine the location of the outermost point.

18. The apparatus of claim 17 wherein the processor travels along the vertical reference pattern by (i) starting at one of the root point of the at least one vertical reference pattern, (ii) proceeding to incrementally advance along the at least one vertical reference pattern until at least one of an edge is no longer detected ahead of the advance and a direction of the edge alters by approximately more than 90°, and (iii) designating a termination of the advance along the at least one vertical reference pattern as the inner corner of the foot of the at least one vertical reference pattern.

19. The apparatus of claim 18 wherein the processor crosses the foot by (i) taking a reading of a light intensity at a present position, (ii) comparing the light intensity against a threshold light intensity, (iii) incrementally advancing the position along a crossing direction until an intensity at a current point exceeds the threshold light intensity, and (iv) designating the current point where the threshold intensity was exceeded as the outermost point.

20. The apparatus of claim 16 wherein the processor is programmed to determine the position of the first and second corner points by (i) comparing an angle of a line connecting the first end point and the second end point with a line connecting the outermost point of each of the at least one vertical reference pattern to determine the predetermined direction, and (ii) calculate the predetermined distance based on the distance between the first and second end point and the at least one vertical reference pattern, as well as the distance between the outermost point of each of the at least one vertical reference pattern.

21. A method for computing a location of at least one data region in a stored image of a symbol, the symbol including a recognition pattern having an outermost bar and at least one vertical reference pattern extending perpendicularly from the recognition pattern, the method comprising the steps of:

locating the outermost bar and at least one vertical reference pattern of the recognition pattern; and dividing the at least one data region of the stored image of the symbol into a plurality of regions based on the located position of the outermost bar and at least one vertical reference pattern.

* * * * *